(12) United States Patent
Shim et al.

(10) Patent No.: US 12,453,200 B2
(45) Date of Patent: Oct. 21, 2025

(54) IMAGE SENSOR

(71) Applicant: SAMSUNG ELECTRONICS CO., LTD., Suwon-si (KR)

(72) Inventors: Eunsub Shim, Suwon-si (KR); Jungchak Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 18/121,222

(22) Filed: Mar. 14, 2023

(65) Prior Publication Data

US 2024/0006429 A1    Jan. 4, 2024

(30) Foreign Application Priority Data

Jun. 29, 2022 (KR) .......................... 10-2022-0079644

(51) Int. Cl.
| | |
|---|---|
| H10F 39/00 | (2025.01) |
| H04N 25/772 | (2023.01) |
| H04N 25/778 | (2023.01) |
| H04N 25/79 | (2023.01) |
| H10F 39/18 | (2025.01) |

(52) U.S. Cl.
CPC ....... *H10F 39/8037* (2025.01); *H04N 25/772* (2023.01); *H04N 25/778* (2023.01); *H04N 25/79* (2023.01); *H10F 39/182* (2025.01)

(58) Field of Classification Search
CPC . H10F 39/8037; H10F 39/182; G04N 25/778; H04N 25/772
See application file for complete search history.

(56) References Cited

U.S. PATENT DOCUMENTS

| | | |
|---|---|---|
| 8,450,728 B2 | 5/2013 | Yamaguchi |
| 9,431,449 B2 | 8/2016 | Toda |
| 10,438,989 B2 | 10/2019 | Kim et al. |
| 11,107,855 B2 | 8/2021 | Fujii et al. |
| 11,240,449 B2 | 2/2022 | Mostafalu et al. |

(Continued)

FOREIGN PATENT DOCUMENTS

| | | | | |
|---|---|---|---|---|
| CN | 111354752 A | * | 6/2020 | ........... H04N 25/616 |
| CN | 114725137 A | * | 7/2022 | ....... H01L 27/14603 |

(Continued)

*Primary Examiner* — Lin Ye
*Assistant Examiner* — Steven Daniel Barry
(74) *Attorney, Agent, or Firm* — Morgan, Lewis & Bockius LLP

(57) ABSTRACT

An image sensor including: a first layer including a plurality of photodiodes arranged in a plurality of pixel regions in a first substrate, an optical region disposed on an upper surface of the first substrate, and an element region, wherein, in at least one of the plurality of pixel regions, the element region includes a first impurity region, a first transfer gate disposed between the first impurity region and the photodiode, a second impurity region isolated from the first impurity region, and a second transfer gate disposed between the second impurity region and the photodiode; and a second layer including a second substrate stacked with the first layer, wherein the second layer includes a first transistor connected to the first impurity region by a first contact, and a second transistor connected to the second impurity region by a second contact.

19 Claims, 17 Drawing Sheets

(56) References Cited

U.S. PATENT DOCUMENTS

| | | | |
|---|---|---|---|
| 2015/0162368 A1* | 6/2015 | Egawa | H04N 23/843 |
| | | | 257/432 |
| 2020/0266150 A1* | 8/2020 | Kim | H01L 23/528 |
| 2021/0005652 A1 | 1/2021 | Gu et al. | |
| 2021/0091127 A1 | 3/2021 | Tsao et al. | |
| 2021/0167113 A1 | 6/2021 | Ryoki et al. | |
| 2021/0203868 A1* | 7/2021 | Veig | G01S 7/4876 |
| 2022/0037388 A1 | 2/2022 | Takizawa et al. | |
| 2022/0077215 A1 | 3/2022 | Horikoshi | |

FOREIGN PATENT DOCUMENTS

| | | | | |
|---|---|---|---|---|
| DE | 112019006136 T5 * | 8/2021 | | H01L 27/14603 |
| KR | 20220006178 A * | 1/2022 | | H04N 25/79 |
| WO | WO-2022102471 A1 * | 5/2022 | | H01L 27/1461 |
| WO | WO-2022244297 A1 * | 11/2022 | | H01L 27/14636 |

* cited by examiner

IMAGE SENSOR

CROSS-REFERENCE TO RELATED APPLICATION(S)

This application claims priority under 35 U.S.C. § 119 to Korean Patent Application No. 10-2022-0079644 filed on Jun. 29, 2022 in the Korean intellectual Property Office, the disclosure of which is incorporated by reference herein in its entirety.

TECHNICAL FIELD

Example embodiments of the present disclosure relate to an image sensor.

DISCUSSION OF THE RELATED ART

An image sensor is a sensor that detects and conveys information used to make an image. For example, an image sensor may be a semiconductor-based sensor for receiving light and generating an electrical signal, and may include a pixel array having a plurality of pixels, and a logic circuit for driving the pixel array and generating an image. Each of the pixels may include a photodiode and a pixel circuit for converting electric charges generated by the photodiode into an electric signal. As the number of pixels included in the image sensor increase and a size of each of the pixels decrease, various techniques of forming elements disposed in each of the pixels and providing a pixel circuit have been suggested.

SUMMARY

An example embodiment of the present disclosure provides an image sensor that can increase a degree of integration density and increase performance by forming elements with pixel circuits on different substrates.

According to an example embodiment of the present disclosure, there is provided an image sensor including: a first layer including a plurality of photodiodes arranged in a plurality of pixel regions in a first substrate, an optical region disposed on an upper surface of the first substrate, and an element region, wherein, in at least one of the plurality of pixel regions, the element region includes a first impurity region, a first transfer gate disposed between the first impurity region and the photodiode, a second impurity region isolated from the first impurity region, and a second transfer gate disposed between the second impurity region and the photodiode; and a second layer including a second substrate stacked with the first layer, wherein the second layer includes a first transistor connected to the first impurity region by a first contact, and a second transistor connected to the second impurity region by a second contact.

According to an example embodiment of the present disclosure, there is provided an image sensor including: a plurality of pixels each having a photodiode and a plurality of elements connected to the photodiode; and a logic circuit configured to obtain a pixel voltage from the plurality of pixels, wherein at least one of the plurality of pixels includes a first transfer transistor and a second transfer transistor connected to the photodiode and isolated from each other, a first floating diffusion in which electric charges moving through the first transfer transistor are accumulated, a second floating diffusion in which electric charges moving through the second transfer transistor are accumulated, a first reset transistor connected to the first floating diffusion, a second reset transistor connected to the second floating diffusion, a first amplifier transistor connected to the first floating diffusion, and a first select transistor connected to the first amplifier transistor, wherein, in the at least one of the plurality of pixels, the first transfer transistor, the second transfer transistor, the first floating diffusion, and the second floating diffusion are disposed on a first substrate, and the first reset transistor, the second reset transistor, the first amplifier transistor, and the first select transistor are disposed on a second substrate stacked with the first substrate.

According to an example embodiment of the present disclosure, there is provided an image sensor including: a first layer including a first substrate and a plurality of pixel regions on the first substrate, wherein a photodiode, a first impurity region and a second impurity region for receiving electric charges generated by the photodiode, a first transfer gate adjacent to the first impurity region and a second transfer gate adjacent to the second impurity region are disposed in at least one of the plurality of pixel regions; a second layer including a second substrate different from the first substrate, and a plurality of transistors formed on the second substrate and forming a pixel together with the at least one of the plurality of pixel regions; and a third layer in which a logic circuit configured to control the first transfer gate, the second transfer gate, and the plurality of transistors is disposed, wherein the logic circuit controls the first transfer gate and the second transfer gate such that the first impurity region and the second impurity region receive the electric charges generated by the photodiode at different time points.

BRIEF DESCRIPTION OF THE DRAWINGS

The above and other features of the present disclosure will be more clearly understood from the following detailed description, taken in conjunction with the accompanying drawings, in which.

DETAILED DESCRIPTION OF THE EMBODIMENTS

Hereinafter, example embodiments of the present disclosure will be described with reference to the accompanying drawings.

Figure 1:
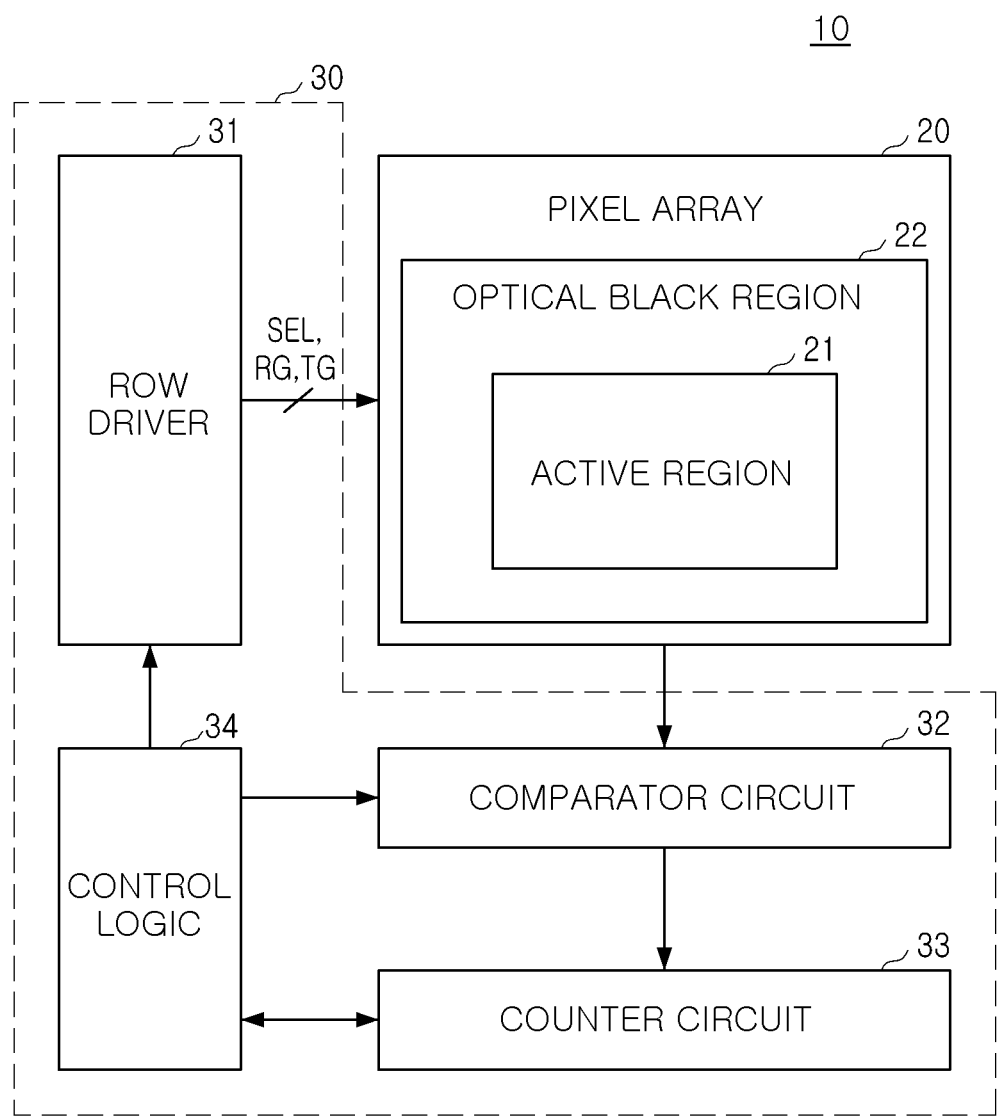
FIG. 1 is a block diagram illustrating an image sensor according to an example embodiment of the present disclosure.

FIG. 1 is a block diagram illustrating an image sensor according to an example embodiment.

Referring to FIG. 1, image sensor 10 may include a pixel array 20 and a logic circuit 30.

The pixel array 20 may include a plurality of pixels arranged in an array form along a plurality of rows and a plurality of columns. Each of the plurality of pixels may include at least one photoelectric conversion element for generating electric charges in response to light, and a pixel circuit for generating a voltage signal corresponding to electric charges generated by the photoelectric conversion element. The photoelectric conversion element may include a photodiode formed of a semiconductor material, and/or an organic photodiode formed of an organic material.

For example, the pixel circuit may include a transfer transistor, a floating diffusion (also referred to as a floating a diffusion region), a reset transistor, a driving transistor, and a select transistor. The configuration of pixels may vary in example embodiments. For example, each of the pixels may include an organic photodiode including an organic material, or may be implemented as a digital pixel. When the pixels are implemented as digital pixels, each of the pixels may include an analog-to-digital converter for outputting a digital pixel signal.

Pixels may be disposed in an active region 21 and an optical black region 22 included in the pixel array 20. For example, each of the pixels disposed in the active region 21 may include an optical region which may transmit light, and pixels disposed in the optical black region 22 may include a light blocking layer for blocking light. The optical region may include a microlens for refracting light and allowing the light to be incident to a photoelectric conversion element such as a photodiode, and a color filter which may allow light of a specific wavelength band to pass therethrough. In the example embodiment illustrated in FIG. 1, the optical black region 22 may surround the active region 21, but differently from the example of FIG. 1, the optical black region 22 may be disposed in various shapes around the active region 21.

The logic circuit 30 may include circuits for controlling the pixel array 20. For example, the logic circuit 30 may include a row driver 31, a comparator circuit 32, a counter circuit 33, and a control logic 34. The row driver 31 may drive the pixel array 20 in a unit of row lines. For example, the row driver 31 may generate a transfer control signal (e.g., TG) for controlling a transfer transistor of the pixel circuit, a reset control signal (e, RG) for controlling the reset transistor, and a select control signal (e.g., SEL) for controlling the select transistor, and may input these signals to the pixel array 20 in a unit of row lines.

The comparator circuit 32 may include a plurality of comparators for comparing a voltage output by each of the pixels disposed in the pixel array 20 with a ramp voltage decreasing or increasing at a predetermined slope. For example, the output of one of the comparators may change based on a time point at which the ramp voltage has the same magnitude as that of the voltage output by each of the pixels.

The counter of the counter circuit 33 may count the time until the time point at which the output of the comparator changes, and may ligitally output the value thereof. For example, the counter may generate a reset digital count value while the comparator receives a reset voltage from the pixel, and may generate a signal digital count value while the comparator receives a pixel voltage from the pixel. The control logic 34 may generate image data using digital data corresponding to a difference between the reset digital count value and the signal digital count value. The control logic 34 may include a timing controller for controlling operation timings of the row driver 31, the comparator circuit 32, and the counter circuit 33.

The pixels disposed in the same position in the vertical direction among the plurality of pixels may share the same column line. For example, the pixels arranged in the same position in the horizontal direction may be simultaneously selected by the row driver 31 and may output pixel signals through connected column lines, respectively. In an example embodiment, the CDS circuit 32 may simultaneously receive voltage signals from pixels selected by the row driver 31 through column lines. For example, the CDS circuit 32 may receive a reset voltage and a pixel voltage in order from each of the pixels, and the pixel voltage may be obtained by reflecting electric charges generated by a photodiode of each of the pixels in the reset voltage.

In the operation of obtaining pixel data for generating an image, the logic circuit 30 may obtain pixel data froth active pixels in the active region 21 and also from dummy pixels in the optical black region 22. Since the dummy pixels include a light blocking layer which may block light entering from the outside, the pixel data obtained from the dummy pixels may correspond to electric charges generated by a cause other than light, for example, a dark current. The logic circuit 30 may subtract pixel data obtained from the dummy pixels from the pixel data obtained from the active pixels. Accordingly, the influence of other causes than light entering from the outside may be reduced.

Figure 2:
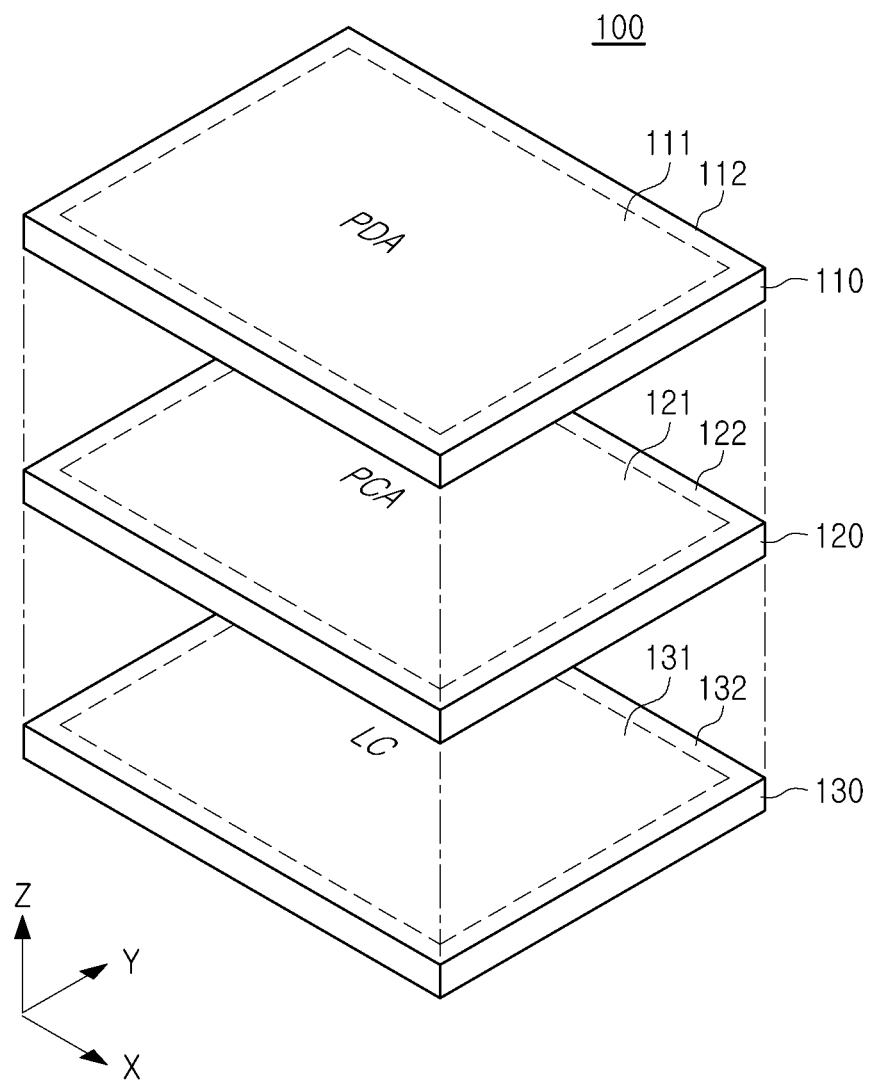
FIG. 2 is a diagram illustrating a stack structure of an image sensor according to an example embodiment of the present disclosure.

FIG. 2 is a diagram illustrating an image sensor according to an example embodiment.

Referring to FIG. 2, image sensor 100 in an example embodiment may include a first layer 110, a second layer 120, and a third layer 130. Each of the first to third layers 110, 120, and 130 may include a semiconductor substrate. For example, the first layer 110 may include a first substrate, the second layer 120 may include a second substrate, and the third layer 130 may include a third substrate. Each of the first to third layers 110, 120, and 130 may include first regions 111, 121, and 131 and second regions 112, 122, and 132. For example, in the first regions 111, 121, and 131, components necessary for operation of the image sensor 100 may be disposed, and the second regions 112, 122, and 132 may be dummy regions.

A photodiode array PDA including a plurality of photodiodes may be disposed in the first region 111 of the first layer 110. For example, the plurality of photodiodes may be disposed along a plurality of pixel regions arranged in a first direction (X-axis direction) and a second direction (Y-axis direction). At least one photodiode may be disposed in each of the plurality of pixel regions, and two or more photodiodes may be disposed in a single pixel region in example embodiments.

In the first region 121 of the second layer 120, a pixel circuit region PCA connected to a plurality of photodiodes disposed in the first layer 110 and providing a pixel circuit may be disposed. A logic circuit LC for driving a plurality of pixels included in a pixel array provided by the first layer 110 and the second layer 120 may be disposed in the first region 131 of the third layer 130.

As described above, a pixel may include at least one photodiode, and elements connected to the photodiode, and the elements may include a floating diffusion, a driving transistor, a reset transistor, a transfer transistor, and a select transistor. In an example embodiment, a floating diffusion and a transfer transistor may be formed on the first layer 110 together with a photodiode, and other elements may be formed on the second layer 120. For example, the driving transistor, the reset transistor, and the select transistor may be formed on the second layer 120 and may be connected to the transfer transistor and the floating diffusion formed on the first layer 110.

Each of the first to third layers 110, 120, and 130 may include a substrate formed of a semiconductor material. To electrically connect the first layer 110 and the second layer 120 to each other, the first layer 110 and the second layer 120 may be connected to each other by a Cu—Cu bonding method on a water level or a chip level. Alternatively, the first layer 110 and the second layer 120 may be connected to each other through a through silicon via (TSV) penetrating the substrate included in the second layer 120.

At least a portion of the driving transistor, the reset transistor, the transfer transistor, and the select transistor, which may provide (e.g., form) the pixel circuit, may be connected to the logic circuit LC. To connect at least a portion of the driving transistor, the reset transistor, the transfer transistor, and the select transistor to the logic circuit LC, the second layer 120 and the third layer 130 may also be connected to each other by a Cu—Cu bonding method or may be connected to each other through a TSV. For example, when the first layer 110 and the second layer 120 are connected to each other by a Cu—Cu bonding method, the second layer 120 and the third layer 130 may be connected to each other through a TSV. When the first layer 110 and the second layer 120 are connected to each other by a TSV, the second layer 120 and the third layer 130 may be connected to each other by a Cu—Cu bonding method.

Figure 3:
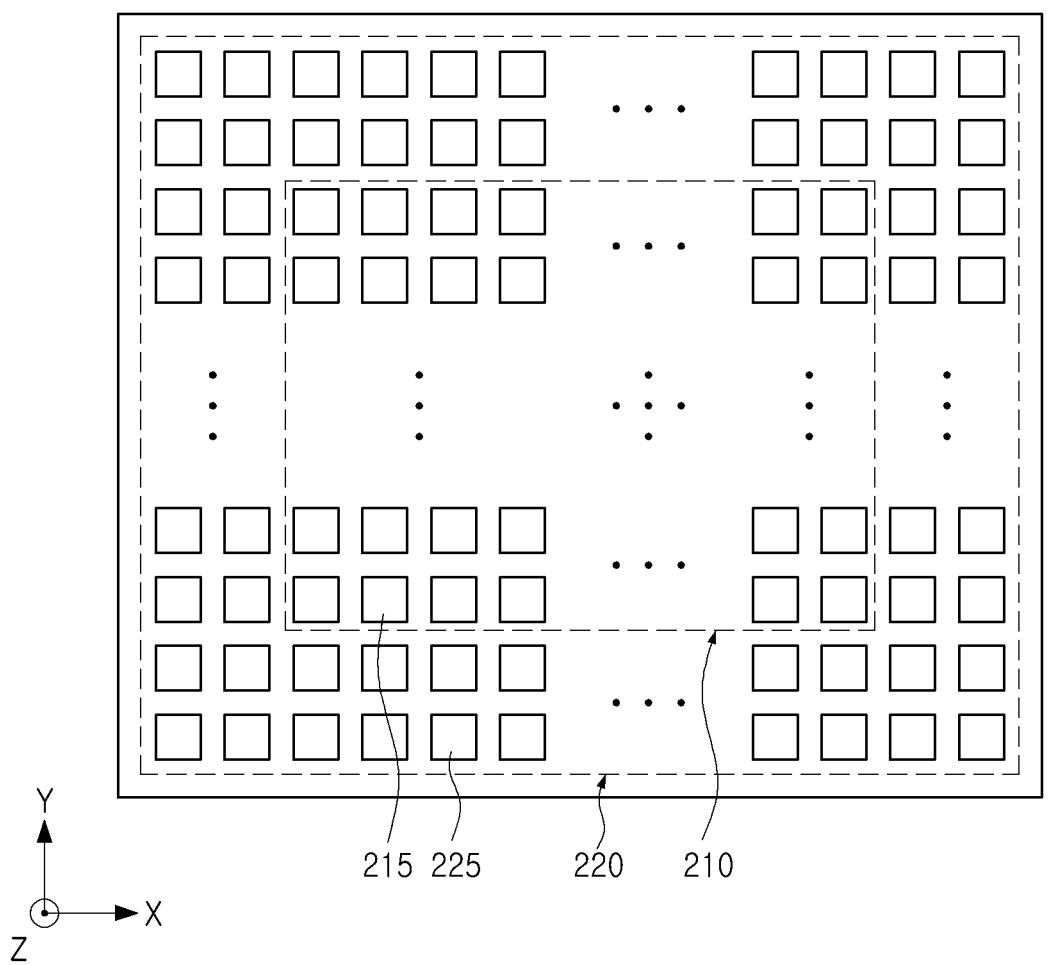
FIG. 3 is a diagram illustrating a pixel array included in an image sensor according to an example embodiment of the present disclosure.

FIG. 3 is a diagram illustrating a pixel array included in an image sensor according to an example embodiment.

Referring to FIG. 3, pixel array 200 in an example embodiment may include an active region 210 and an optical black region 220. A plurality of pixels 215 disposed in the active region 210 may be configured to output a voltage signal based on electric charges generated in response to light. A plurality of dummy pixels 225 disposed in the optical black region 220 may output a voltage signal in the absence of light interference.

A structure of the plurality of pixels 215 may be similar to a structure of the plurality of dummy pixels 225. Each of the plurality of pixels 215 and the plurality of dummy pixels 225 may include a photodiode for generating electric charges in response to light, and a plurality of elements connected to the photodiode and for outputting a pixel signal corresponding to electric charges. However, different from the plurality of pixels 215 in which microlenses and color filters are disposed in a light travelling path, the plurality of dummy pixels 225 may include a light blocking layer for blocking light.

In an example embodiment, a portion of the elements included in each of the plurality of pixels 215 and the plurality of dummy pixels 225 may be formed in a dispersed manner on different substrates. For example, the floating diffusion and the transfer transistors may be formed together on a first substrate on which a photodiode is formed, and elements such as a driving transistor, a reset transistor, and a select transistor may be formed on a second substrate different from the first substrate.

Accordingly, only the floating diffusion and the transfer transistor excluding the other elements may be formed in each of the plurality of pixel regions corresponding to the plurality of pixels on the first substrate, and a plurality of floating diffusions and a plurality of transfer transistors may be formed in one pixel region. For example, using the plurality of floating diffusions and the plurality of transfer transistors, the dynamic range of the image sensor may improve and the quality of an image output by the image sensor may improve. Alternatively, a time-of-flight (ToF) sensor function for measuring a distance to an object or generating a depth map may be implemented using the plurality of floating diffusions and the plurality of transfer transistors.

In addition, an it age sensor operating by a global shutter method may be implemented using the plurality of floating diffusions and the plurality of transfer transistors. When the image sensor operates by the global shutter method, at least one of the plurality of floating diffusions may not be connected to the driving transistor and may be directly connected to a power node for supplying a power voltage.

Figure 4:
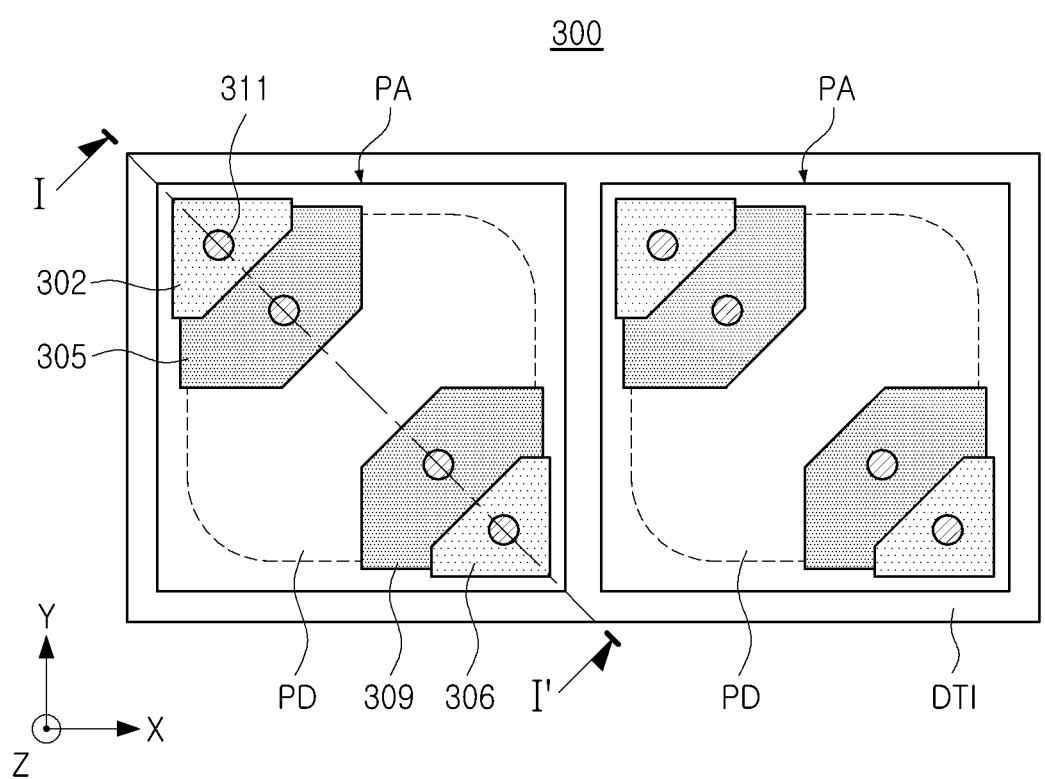
FIG. 4 is a diagram illustrating a portion of pixels included in an image sensor according to an example embodiment of the present disclosure.

FIG. 4 is a diagram illustrating a portion of pixels included in an image sensor according to an example embodiment.

In image sensor 300 in an example embodiment, each of the plurality of pixels may include a photodiode for generating electric charges in response to light, and elements for outputting a voltage signal based on the electric charges generated by the photodiode. As described above, the elements may include a transfer transistor, a floating diffusion, a driving transistor, a reset transistor, and a select transistor.

As described above with reference to FIG. 2, the image sensor 300 in an example embodiment may include first, second and third layers, the first layer may include a first substrate, the second layer may include a second substrate, and the third layer may include a third substrate. A plurality of pixel regions PA may be provided in the first layer, and a plurality of photodiodes PD may be arranged in the plurality of pixel regions PA.

Among the elements included in each of the plurality of pixels, the transfer transistor and the floating diffusion may be formed on the first substrate together with the photodiode. The other elements, such as, for example, a driving transistor, a reset transistor, and a select transistor, may be formed on the second substrate and may be connected to the transfer transistor and the floating diffusion. A logic circuit configured to, by driving a plurality of pixels, obtain a voltage signal and generate image data may be formed on the third substrate of the third layer.

FIG. 4 may be a plan diagram illustrating a portion of the plurality of pixel regions PA included in the first layer of the image sensor 300. Referring to FIG. 4, the pixel regions PA may be adjacent to each other in the first direction (X-axis direction) and may be isolated from each other by a pixel isolation layer DTI. A photodiode PD may be disposed in each of the pixel regions PA.

Referring to FIG. 4, each of the pixel regions PA may include a first impurity region 302, a first transfer gate 305, a second impurity region 306, and a second transfer gate 309. A contact 311 may be connected to each of the first impurity region 302, the first transfer gate 305, the second impurity region 306, and the second transfer gate 309.

The first impurity region 302 may be a first floating diffusion in which electric charges generated by the photodiode PD may be accumulated, and the first transfer gate 305 may be connected to the first impurity region 302 and the photodiode and may constitute a first transfer transistor. Similarly, the second impurity region 306 may be a second floating diffusion, and the second transfer gate 309 may be connected to the second impurity region 306 and the photodiode PD and may constitute a second transfer transistor.

As illustrated in FIG. 4, only the floating diffusion and the transfer transistor may be formed on the first substrate 301 (see FIG. 5) of the first layer. Accordingly, the plurality of pixels may not be implemented using only the first layer, and the other elements necessary for implementing the plurality of pixels may be formed in the second layer different from the first layer.

As described above, by forming a portion of the elements necessary to implement each of the plurality of pixels on the second layer in a divided manner, an area for forming a plurality of floating diffusions and a plurality of transfer transistors may be secured in each of the pixel areas PA defined by the pixel isolation layer DTI. Accordingly, each of the plurality of pixels may include a plurality of floating diffusions and a plurality of transfer transistors, and accordingly, an image sensor for improving performance or providing various functions may be implemented.

As an example, a ToF sensor may be implemented by inputting control signals having different phases with respect to the first transfer gate 305 and the second transfer gate 309. In addition, while the photodiode PD is exposed to light after a reset operation of removing electric charges of each of the first impurity region 302 and the second impurity region 306, by inputting different turn-off voltages to the first transfer gate 305 and the second transfer gate 309, the dynamic range of the image sensor may improve.

In the example embodiment in FIG. 4, the first impurity region 302 and the second impurity region 306 may be isolated from each other in a diagonal direction intersecting the first direction and the second direction. For example, the first impurity region 302 may be disposed adjacent to one of the corners of each of the pixel regions PA, and the second impurity region 306 may be disposed adjacent to the other corner in the diagonal direction. In this case, as illustrated in FIG. 4, the first transfer gate 305 and the second transfer gate 309 may be disposed between the first impurity region 302 and the second impurity region 306 in the diagonal direction.

Hereinafter, the structure of the first layer in the image sensor in an example embodiment will be described in greater detail with reference to FIG. 5.

Figure 5:
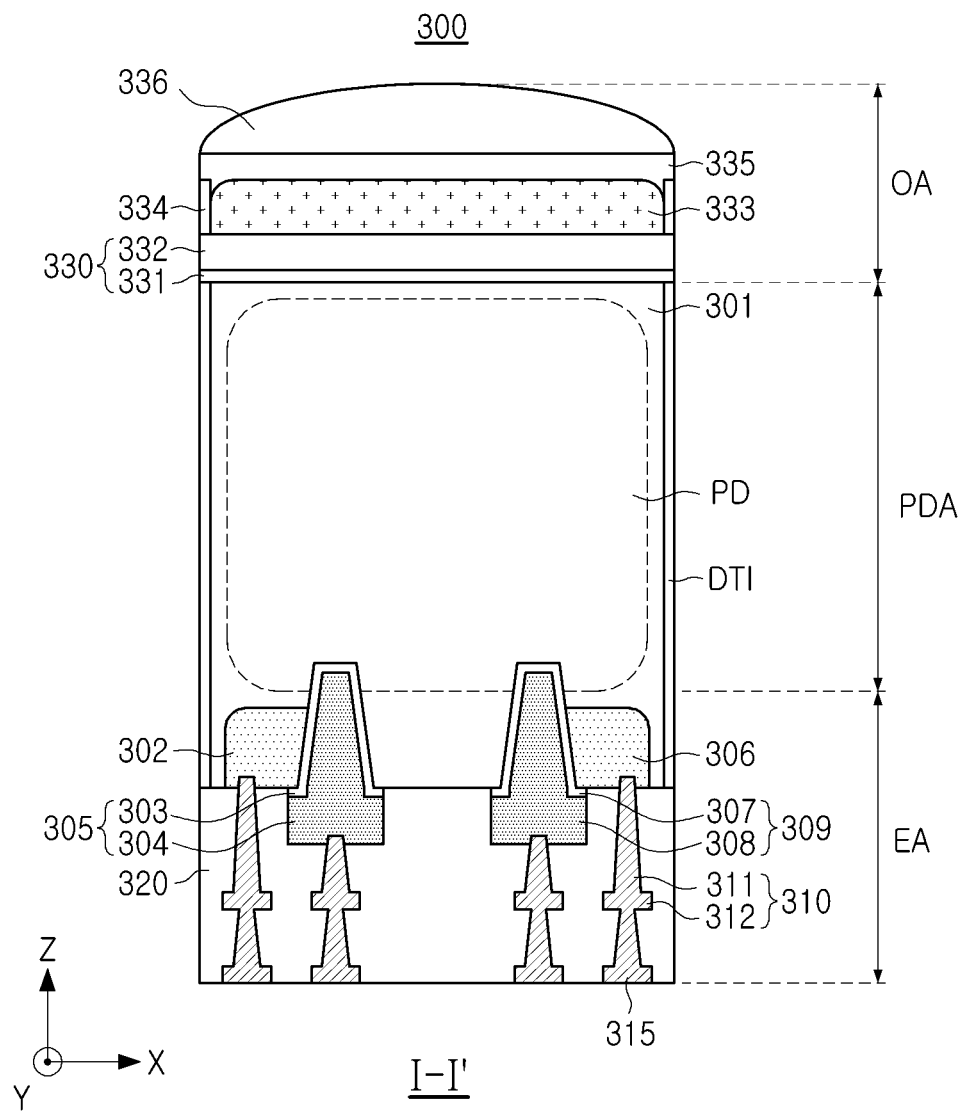
FIG. 5 is a cross-sectional diagram taken along in FIG. 4.

FIG. 5 is a cross-sectional diagram taken along line I-I' in FIG. 4.

FIG. 5 illustrates a cross-section taken in the I-I' direction in FIG. 4, and further illustrates a photodiode region PDA on the first substrate 301, and an optical region OA and an element region EA above/below the first substrate 301. Referring to FIG. 5, the first layer of the image sensor 300 according to an example embodiment may include the photodiode region PDA, the optical region OA, and the element region EA. In the photodiode region PDA, the photodiodes PD may be arranged along a plurality of pixel regions defined by the pixel isolation layer DTI.

The optical region OA may be disposed on the upper surface of the first substrate 301, and may include a horizontal insulating layer 330, a color filter 333, a filter isolation film 334, a planarization layer 335, and a microlens 336. The horizontal insulating layer 330 may include a first horizontal insulating layer 331 and a second horizontal insulating layer 332. For example, the first horizontal insulating layer 331 may be formed of a material having a dielectric constant higher than that of the second horizontal insulating layer 332, and may have a thickness smaller than that of the second horizontal insulating layer 332. A portion of defects in the first substrate 301 may be cured by the first horizontal insulating layer 331.

The filter isolation film 334 may extend in a first direction (X-axis direction) and a second direction (Y-axis direction) similarly to the pixel isolation layer DTI, such that the color filter 333 may be arranged along the plurality of pixel regions. The microlens 336 may refract light incident from the outside and may allow the light to travel to the color filter 333, and light of a specific wavelength band may be selectively incident to the photodiode 113 by the color filter 333.

The element region EA may be disposed on the lower surface of the first substrate 301 and may include the first and second impurity regions 302 and 306 and the first and second transfer gates 305 and 309 formed in the first substrate 301. As described above, the first impurity region 302 may provide a first floating diffusion, and the second impurity region 306 may provide a second floating diffusion. In addition, the first transfer gate 305 may provide a first transfer transistor together with the first impurity region 302 and the first photodiode PD1, and the second transfer gate 309 may provide a second transfer transistor together with the second impurity region 306 and the photodiode PD.

The first impurity region 302 and the second impurity region 306 may be doped with impurities of the same conductivity type, and may be doped with an N-type impurities, for example. Each of the first transfer gate 305 and the second transfer gate 309 may have a structure in which at least a portion thereof may be embedded in the first substrate 301. The first transfer gate 305 may include a first gate insulating layer 303 and a first gate electrode layer 304, and the second transfer gate 309 may include a first gate insulating layer 307 and a first gate electrode layer 308.

Each of the first and second impurity regions 302 and 306 and the first and second transfer gates 305 and 309 may be connected to first wiring patterns 311-312 (310) including the contact 311. The first wiring patterns 310 may be formed in a first interlayer insulating layer 320 and may be electrically connected to first pads 315 exposed externally of the first interlayer insulating layer 320.

As described with reference to FIGS. 4 and 5, in the first layer of the image sensor 300 in an example embodiment, only photodiodes PD, the first and second impurity regions 302 and 306 providing floating diffusions, and the first and second transfer gates 305 and 309 may be formed, and the other elements necessary to implement a plurality of pixels may be formed in the second layer. The first layer and the second layer may be stacked in a third direction (Z-axis direction) perpendicular to the upper surface of the first substrate 301, and the second layer may include a second substrate different from the first substrate 301.

In addition, the first layer and the second layer may be stacked in a third direction with a third layer in which a row driver, a correlated double sampling (CDS) circuit, an analog-to-digital converter (ADC) circuit, and a control logic necessary for operation of the image sensor are disposed. Accordingly, the image sensor may include first to third layers stacked in order, and the third layer may be formed on a third substrate different from the first and second substrates, and elements formed on the third substrate and providing a row driver, a CDS circuit, an ADC circuit, and a control logic. Hereinafter, the structure of the image sensor will be described in greater detail with reference to FIGS. 6 and 7.

Figure 6:
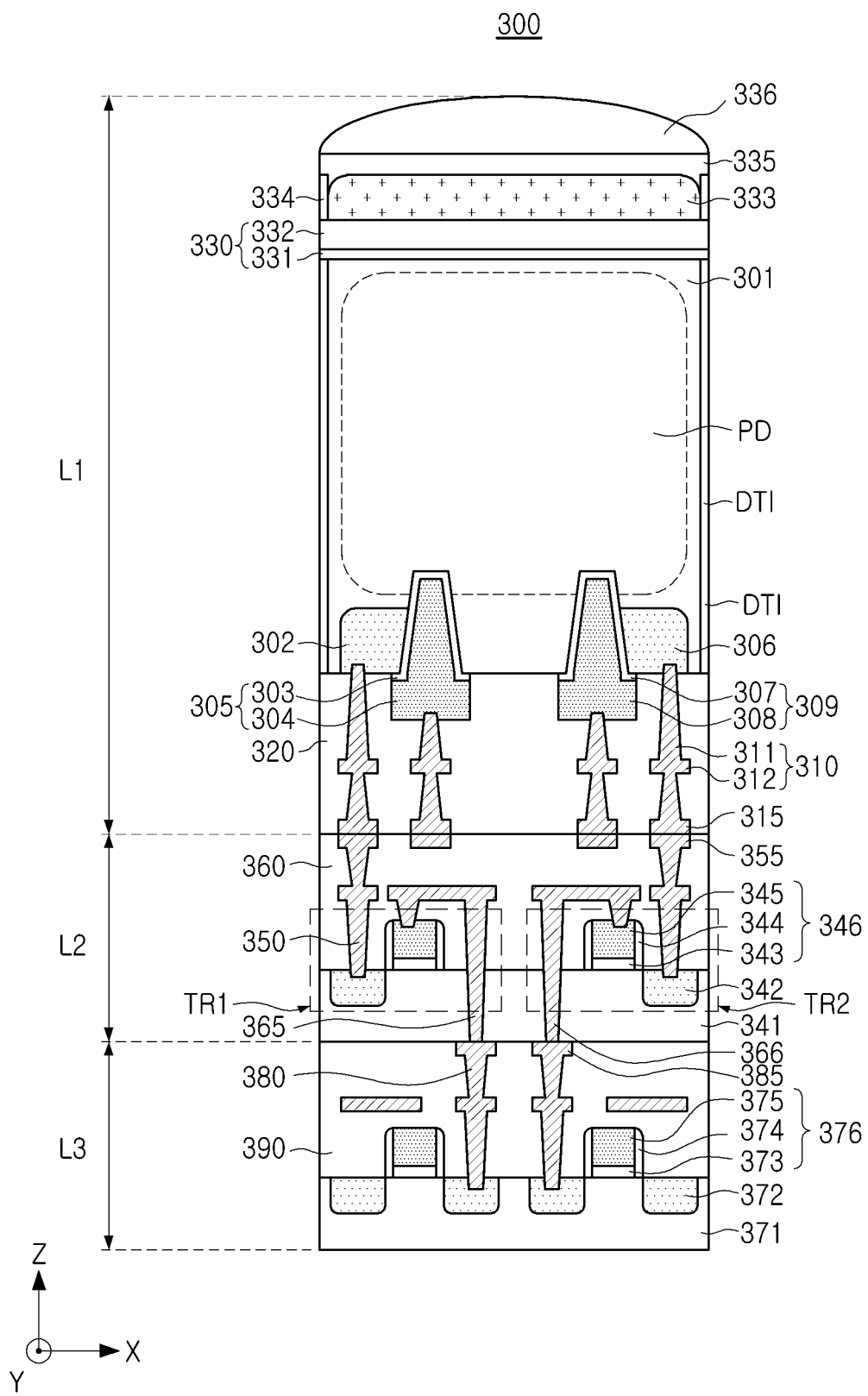
FIGS. 6 and 7 are diagrams illustrating pixels of an image sensor according to an example embodiment of the present disclosure.
Figure 7:
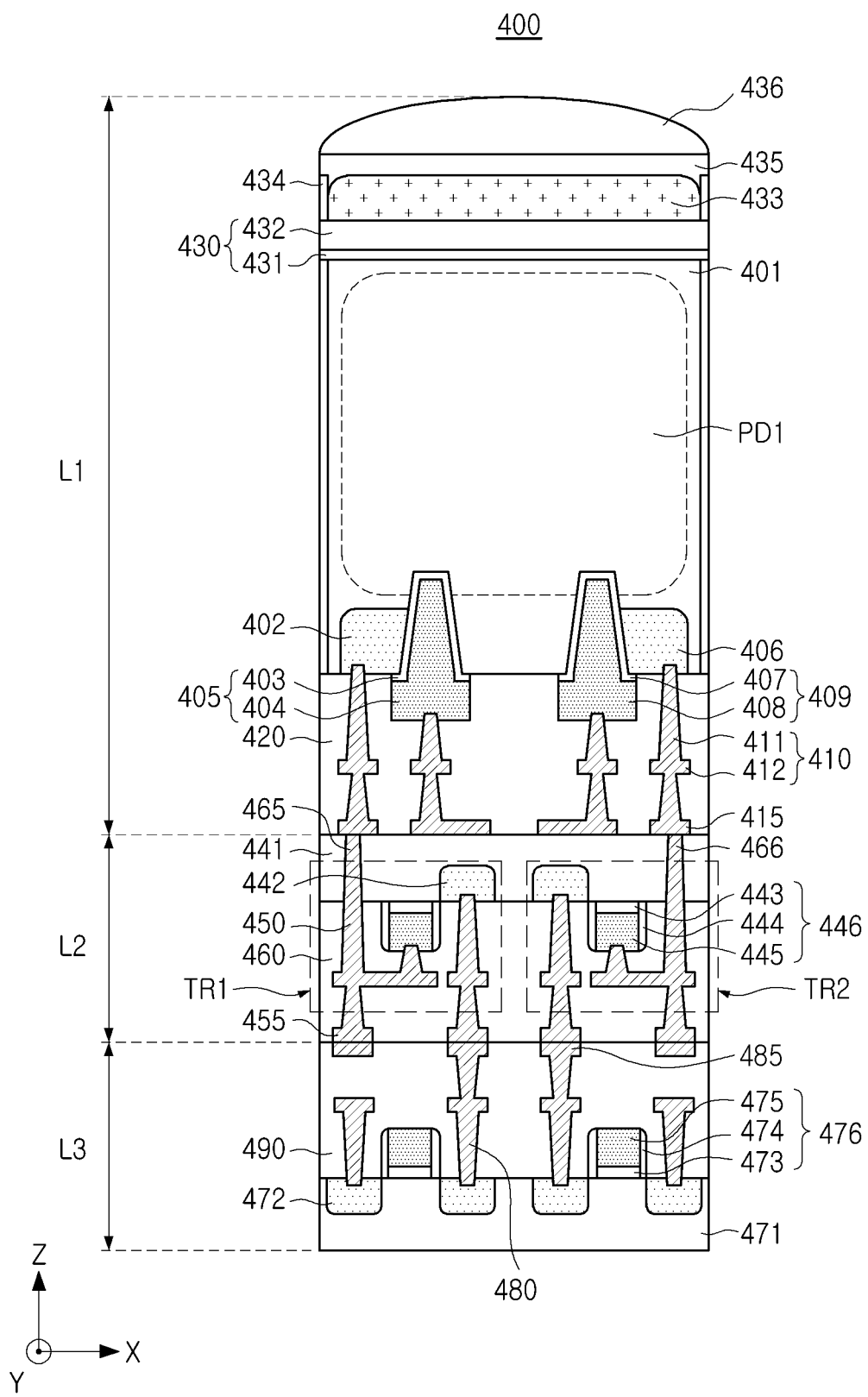

FIGS. 6 and 7 are diagrams illustrating pixels of an image sensor according to an example embodiment.

Referring to FIG. 6, the image sensor 300 in an example embodiment may include a first layer L1, a second layer L2, and a third layer L3 stacked in a third direction (Z-axis direction). The structure of the first layer L1 may be understood with reference to the descriptions described with reference to FIGS. 4 and 5. In other words, like reference numerals may refer to like elements. For example, the first layer L1 may include a first substrate 301, and a photodiode PD, first and second impurity regions 302 and 306 providing floating diffusions, and first and second transfer gates 305 and 309 providing transfer transistors may be formed on the first substrate 301. An optical region including a horizontal insulating layer 330, a color filter 333, and a microlens 336 may be disposed on the first substrate 301.

The second layer L2 may include a second substrate 341 and a plurality of elements formed on the second substrate 341. Referring to FIG. 6, the elements of the second layer L2 may be include an impurity region 342 and a gate structure 346, and the gate structure 346 may include a gate insulating layer 343, a gate spacer 344, and a gate electrode layer 345.

The impurity region 342 and the gate structure 346 may be connected to a second wiring pattern including a contact 350. A portion of the second wiring pattern may be connected to a second pad 355 exposed externally of the second interlayer insulating layer 360. In addition, another portion of the second wiring pattern may be connected to via structures 365 and 366 penetrating the second substrate 341.

The elements of the second layer L2 may include a first transistor TR1 directly connected to the first impurity region 302 of the first layer L1, and a second transistor TR2 directly connected to the second impurity region 306 of the first layer L1. For example, the first transistor TR1 and the second transistor TR2 may be disposed in each of a plurality of regions defined in the second layer L2, and the plurality of regions may correspond to the plurality of pixel regions included in the first layer LL Referring to FIG. 6, the active region of the first transistor TR1 may be directly connected to the first impurity region 302, and the active region of the second transistor TR2 may be directly connected to the second impurity region 306, For example, the first transistor TR1 may be a first reset transistor, and the second transistor TR2 may be a second reset transistor.

The via structures 365 and 366 may be a through silicon via (TSV) penetrating the second substrate 341. The via structures 365 and 366 may be connected to third pad 385 included in the third layer L3, such that elements of the second layer L2 may be connected to the elements formed in the third layer L3 by through via structures 365 and 366. For example, in the example embodiment illustrated in FIG. 6, an element connected to the first transistor TR1 through the first via structure 365, and an element connected to the second transistor TR2 through the second via structure 366 may be elements included in the row driver.

The third layer L3 may include a third substrate 371 and a plurality of elements formed on the third substrate 371. The elements of the third layer L3 may include an impurity region 372 and a gate structure 376, and the gate structure 376 may include a gate insulating layer 373, a gate spacer 374, and a gate electrode layer 375. The impurity region 372 and the gate structure 376 may be connected to a second wiring pattern including a contact 380, and the second wiring pattern may be connected to the first via structure 365 of the second layer L2 through the third pad 385 externally of the third interlayer insulating layer 390.

The first transfer gate 305 and the second transfer gate 309 formed in the first layer L1 may be connected to elements formed in the third layer L3. For example, the first transfer gate 305 and the second transfer gate 309 may be connected to the elements of the third layer L3 through the second wiring pattern of the second layer L2. The first transfer gate 305 and the second transfer gate 309 may be connected to a portion of the elements included in the row driver.

In the example embodiment illustrated in FIG. 6, the first layer L1 and the second layer L2 may be connected to each other by a Cu—Cu bonding method, and the second layer L2 and the third layer L3 may be connected to the first and second via structures 365 and 366 through a silicon via. Accordingly, as illustrated in FIG. 6, the first wiring pattern 310 of the first layer L1 and the second wiring pattern of the second layer L2 may be formed between the first substrate 301 and the second substrate 341 in the third direction. The first transistor TR1 and the second transistor TR2 may also be disposed between the first substrate 301 and the second substrate 341 in the third direction.

Referring to FIG. 7, image sensor 400 in an example embodiment may include a first layer L1, a second layer L2, and a third layer L3 stacked on each other. The structure of the first layer L1 may be understood with reference to the description described in the aforementioned example embodiment. The first layer L1 may include a first substrate 401, and a photodiode PD1, impurity regions 402 and 406 providing floating diffusions, and transfer gates 405 and 409 providing transfer transistors may be formed on the first substrate 401.

A first wiring pattern 410 connected to the impurity regions 402 and 406 and the transfer gates 405 and 409, and a first interlayer insulating layer 420 in which the first wiring pattern 410 is embedded may be disposed below the first substrate 401. A first pad 415 may be exposed externally of the first interlayer insulating layer 420.

An optical region including a horizontal insulating layer 430, a color filter 433, a filter isolation film 434, a planarization layer 435, and a microlens 436 may be disposed on the first substrate 401. The horizontal insulating layer 430 may include a first horizontal insulating layer 431 and a second horizontal insulating layer 432 formed of materials having different dielectric constants.

The elements constituting the transfer gates 405 and 409 and the first wiring pattern 410 may correspond to the transfer gate 305 and 309 and the first wiring pattern 310 of FIG. 6, expect that they are denoted with reference numerals starting with '4'.

The second layer L2 may include a second substrate 441, an impurity region 442 formed in the second substrate 441, and a plurality of elements provided by a gate structure 446. The gate structure 446 may include a gate insulating layer 443, a gate spacer 444, and a gate electrode layer 445.

The impurity region 442 and the gate structure 446 may be connected to the second wiring pattern including a contact 450. A portion of the second wiring pattern may be connected to a second pad 455 exposed externally of a second interlayer insulating layer 460, and the other portion of the second wiring may be connected to via structures 465 and 466 penetrating the second substrate 441.

The elements of the second layer L2 may include a first transistor TR1 directly connected to the first impurity region 402 of the first layer L1, and a second transistor TR2 directly connected to the second impurity region 406 of the first layer L1. In an example embodiment, a third transistor and a fourth transistor may be disposed in each of a plurality of regions defined in the second layer L2 with the first transistor TR1 and the second transistor TR2, and the plurality of regions can correspond to the plurality of pixel regions included in the first layer L1. The plurality of regions can correspond to the plurality of pixel regions in a one-to-one manner, or each of the plurality of regions can correspond to two or more of the plurality of pixel regions. For example, the third transistor can be a first reset transistor and the fourth transistor can be a second reset transistor.

Referring to FIG. 7, the gate structure of the first transistor TR1 may be directly connected to the first impurity region 402 through the first via structure 465, and the gate structure of the second transistor TR2 may be directly connected to the second impurity region 406 through the second via structure 466. The first transistor TR1 may be a first driving transistor, and the second transistor TR2 may be a second driving transistor. For example, the first driving transistor and the second driving transistor may be connected to different column lines. The first and second via structures 465 and 466 may each be a through silicon vias (TSV) penetrating the second substrate 441, and one surface of the second substrate 441 may be directly attached to the first layer L1.

The second pad 455 of the second layer L2 may be directly connected to a third pad 485 of the third layer L3. For example, each of the second pad 455 and the third pad 485 may be formed of copper and may be attached to each other by a Cu—Cu bonding process.

The third layer L3 may include a third substrate 471 and a plurality of elements formed on the third substrate 471, and the elements of the third layer L3 may be provided by an impurity region 472 and a gate structure 476. The elements of the third layer L3 may be connected to a third wiring pattern including a contact 480, and the third wiring pattern may be connected to the second pad 455 of the second layer L2 through the third pad 485. The third layer L3 may also include a third interlayer insulating layer 490 and the gate structure 476 may include a gate insulating layer 473, a gate spacer 474, and a gate electrode layer 475.

In the example embodiment illustrated in FIG. 7, differently from the example embodiment illustrated in FIG. 6, a different surface of the second substrate 441 may be directly attached to the first layer L1. Accordingly, wiring patterns of the second layer L2 and the third layer L3 may be disposed between the second substrate 441 and the third substrate 471 in the third direction.

Figure 8A:
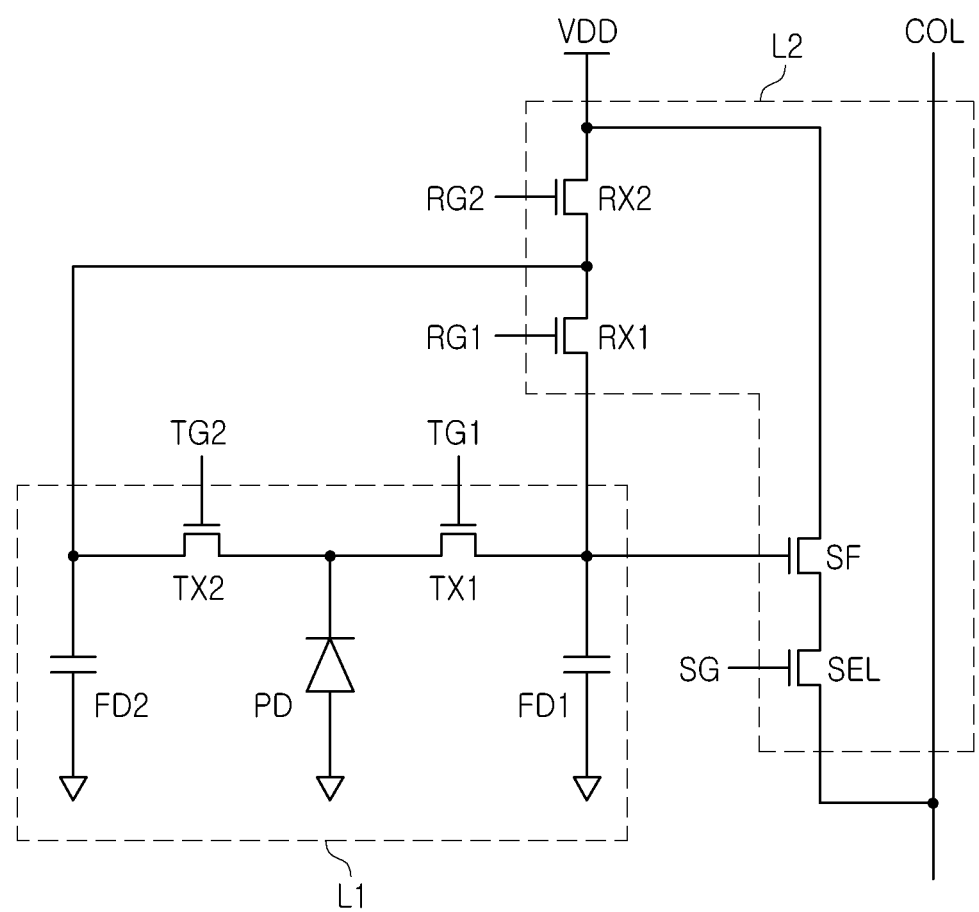
FIGS. 8A and 8B are circuit diagrams illustrating pixels included in an image sensor according to an example embodiment of the present disclosure.
Figure 8B:
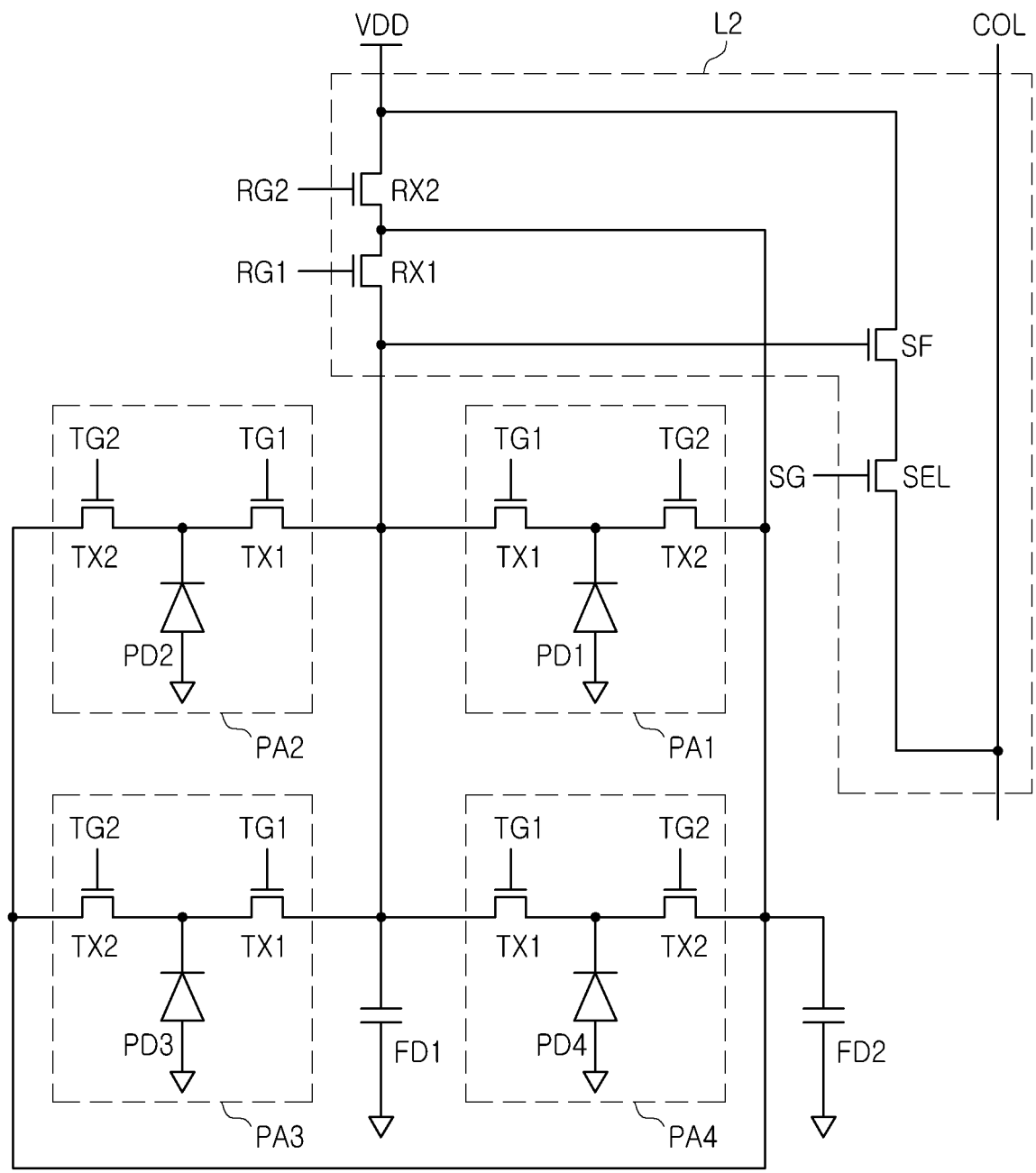

FIGS. 8A and 8B are circuit diagrams illustrating pixels included in an image sensor according to an example embodiment. FIGS. 9 to 13 are diagrams illustrating operations of an image sensor according to an example embodiment.

Referring first to FIG. 8A, a pixel of an image sensor in an example embodiment may include a photodiode PD, a first floating diffusion FD1, a second floating diffusion FD2, a first transfer transistor TX1, a second transfer transistor TX2, a first reset transistor RX1, a second reset transistor RX2, a driving transistor SF, and a select transistor SEL. As described above with reference to FIGS. 6 and 7, the first floating diffusion FD1 may be provided by the first impurity region (e.g., 302/402) of the first layer L1, and the second floating diffusion FD2 may be provided by the second impurity region (e.g., 306/406) of the first layer L1. The first transfer transistor TX1 and the second transfer transistor TX2 may also be formed in the first layer L1.

The first reset transistor RX1, the second reset transistor RX2, the driving transistor SF, and the select transistor SEL may be formed in the second layer L2. As illustrated in FIG. 8A, one of the active regions of the first reset transistor RX1 may be directly connected to the first floating diffusion FD1, and one of the active regions of the second reset transistor RX2 may be directly connected to the second floating diffusion FD2. For example, as described with reference to FIG. 7, by directly connecting the first impurity region 402 and the active region of the first transistor TR1 to the first via structure 465, or directly connecting the second impurity region 406 and the active region of the second transistor TR2 to the second via structure 466, a pixel may be implemented with the circuit illustrated in FIG. 8A.

When electric charges by light are generated by the photodiode PD, electric charges may be accumulated in the first floating diffusion FD1 and the second floating diffusion FD2 by the first transfer transistor TX1 and/or the second transfer transistor TX2. The driving transistor SF may operate as a source-follower amplifier which may amplify and output a voltage of the first floating diffusion Mi. The select transistor SEL may output a voltage signal output by the driving transistor SF to a column line COL.

Hereinafter, operations of the pixel will be described with reference to FIG. 9 as well.

Figure 9:
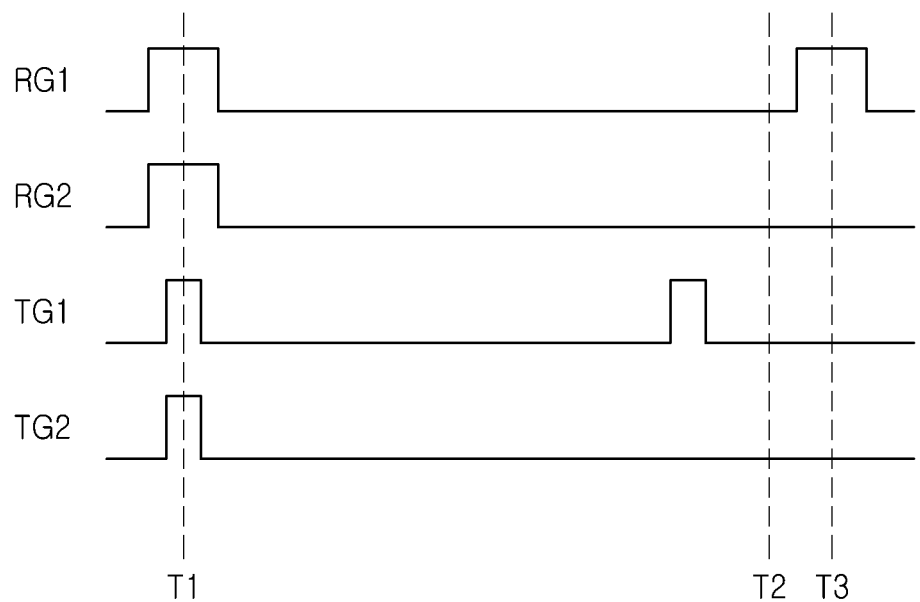
FIGS. 9, 10, 11, 12 and 13 are diagrams illustrating operations of an image sensor according to an example embodiment of the present disclosure.

Referring to FIG. 9, the first reset transistor RX1, the second reset transistor RX2, the first transfer transistor TX1, and the second transfer transistor TX2 may be turned on by a first reset control signal RG1, a second reset control signal RG2, a first transfer control signal TG1 and a second transfer control signal TG2. Accordingly, a reset operation in which electric charges of the first floating diffusion FD1, the second floating diffusion FD2, and the photodiode PD are removed may be performed by a power voltage VDD.

When the reset operation is performed, the logic circuit formed in the third layer L1 may operate and may read a reset voltage from the pixel. For example, the row driver may turn on the select transistor SEL of the pixel at a first time point T1, and the CDS circuit may read the reset voltage through the column line COL.

Thereafter, while the first reset transistor RX1, the second reset transistor RX2, the first transfer transistor TX1, and the second transfer transistor TX2 are turned off, the photodiode PD may generate electric charges in response to light. The time in which the photodiode PD generates electric charges may be referred to as an exposure time.

When intensity of light incident to the photodiode PD during the exposure time is strong, the photodiode PD may be saturated with electric charges. When the photodiode PD is saturated before the exposure time elapses, the pixel may not be able to output a voltage signal in which intensity of light incident from the outside is sufficiently reflected, and accordingly, image quality may deteriorate. For example, in an imaging condition in which intensity of light is extremely strong, a difference in brightness between pixels may not be sufficiently represented, and accordingly, a dynamic range of the image sensor may decrease.

In an example embodiment, using the second transfer transistor TX2 and the second floating diffusion FD2 the above issues may be addressed, and performance of the image sensor may improve. For example, the first transfer transistor TX1 may be turned off more strongly than the second transfer transistor TX2 during the exposure time. For example, during the exposure time, the first transfer control signal TG1 may be maintained at a first turn-off voltage and the second transfer control signal TG2 may be maintained at a second turn-off voltage, and the level of the second turn-off voltage may be higher than the level of the first turn-off voltage. In this case, more leakage current may flow in the second transfer transistor TX2 than in the first transfer transistor TX1

For example, the first turn-off voltage may be a negative voltage, and the second turn-off voltage may be a ground voltage. Accordingly, more leakage current may flow in the second transfer transistor TX2 than in the first transfer transistor TX1. When intensity of light is extremely strong such that the photodiode PD is saturated, electric charges further generated after the photodiode PD is saturated may move to the second floating diffusion FD2 through the second transfer transistor TX2.

When the exposure time elapses, the first transfer transistor TX1 may be turned on by the first transfer control signal TG1. When the first transfer transistor TX1 is turned on, electric charges generated by the photodiode PD may move to the first floating diffusion FD1 during the exposure time. Accordingly, the time point at which the first floating diffusion FD1 receives electric charges froth the photodiode PD may be different from the time point at which the second floating diffusion FD2 receives electric charges from the photodiode PD.

A voltage input to the gate of the driving transistor SF may decrease due to electric charges moving to the first floating diffusion FD1. Thereafter, when the row driver turns on the select transistor SEL at a second time point T2, the CDS circuit may read the first pixel voltage through the column line COL.

However, as described above, electric charges further generated after the photodiode PD is saturated may already move from the photodiode PD to the second floating diffusion FD2 during the exposure time. Accordingly, electric charges generated by the photodiode PD may not be entirely reflected in the first pixel voltage read at the second time point 12.

Accordingly, in an example embodiment, the first reset transistor RX1 of the pixel may be turned on by the logic circuit after the second time point 12. As the first reset transistor RX1 is turned on, the second floating diffusion FD2 may be connected to the first floating diffusion FD1, and electric charges moving to the second floating diffusion FD2 during the exposure time may be combined with electric charges moving to the first floating diffusion FD1 by the operation of turning on the first transfer transistor TX1 after the exposure time.

The logic circuit may read the second pixel voltage through the column line COL at a third time point T3 at which the first reset transistor RX1 is turned on. When a large amount of electric charges is generated such that the photodiode PD is saturated during the exposure time, the first pixel voltage and the second pixel voltage may be different from each other. In this case, the logic circuit may obtain pixel data using the second pixel voltage and the reset voltage. According to an example embodiment, the logic circuit may read the second pixel voltage after the first reset transistor RX1 is switched to a turn-off state.

In the example embodiment illustrated in FIG. 8B, two or more pixel regions PA1-PA4 disposed on the first layer L1 may share the first reset transistor RX1, the second reset transistor RX2, the driving transistor SF, and the select transistor SEL disposed on the second layer L2. The first, second, third and fourth pixel regions PA1, PA2, PA3 and PA4 may be disposed adjacent to each other in the first layer LT. In addition, the first impurity regions disposed in the first to fourth pixel regions PA1-PA4 may be electrically connected to each other and may provide a first floating diffusion FD1, and the second impurity regions disposed in the first to fourth pixel regions PA1 to PA4 may be electrically connected to each other and may provide a second floating diffusion FD2.

The operation of the image sensor according to the example embodiment illustrated in FIG. 8B may be similar to the example described above with reference to FIGS. 8A and 9. The first to fourth pixel regions PA1 to PA4 may be selected in order and may output a reset voltage and a pixel voltage through the driving transistor SF and the select transistor SEL. In addition, the logic circuit may obtain a first pixel voltage when the first reset transistor RX1 is in a turn-off state and a second pixel voltage when the first reset transistor RX2 is in a turn-on state with respect to each of the first to fourth photodiodes PD1 to PD4, thereby improving a dynamic range of the image sensor.

Figure 10:
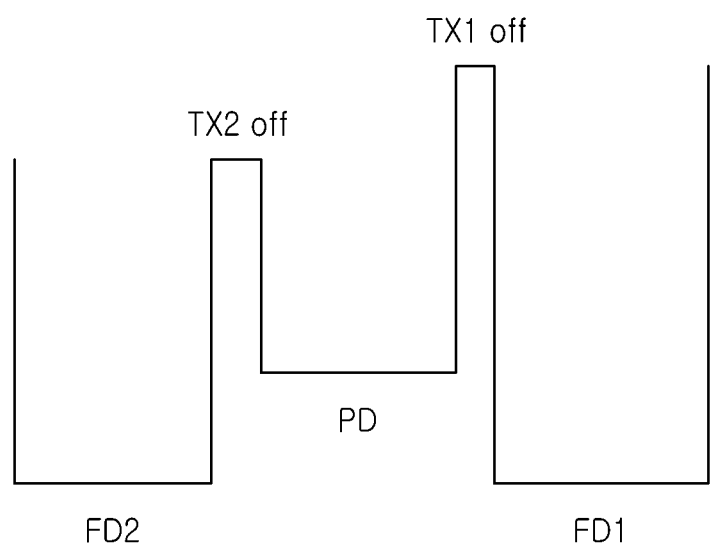
Figure 11:
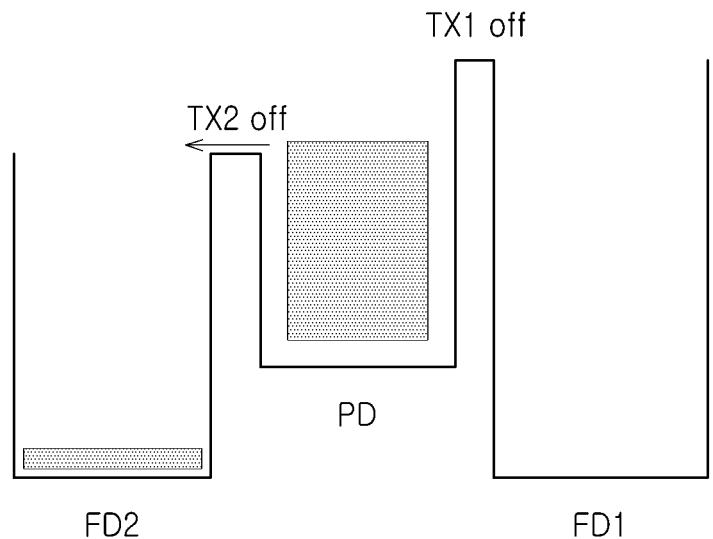
Figure 12:
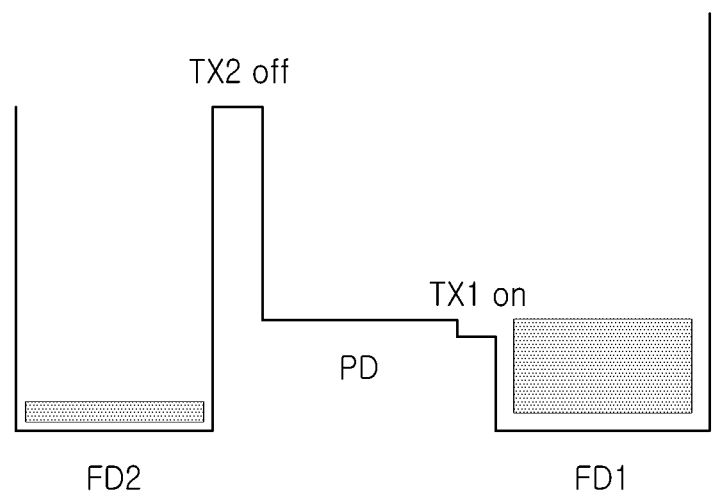
Figure 13:
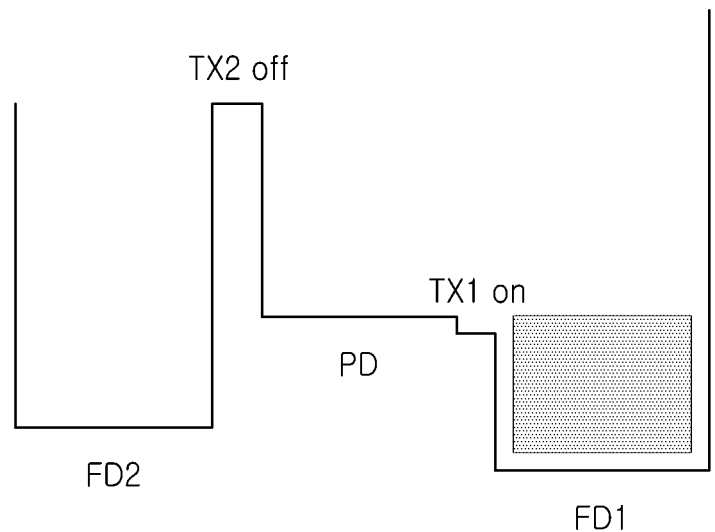

FIGS. 10 to 13 are diagrams illustrating states of the photodiode PD, the first floating diffusion FD1, and the second floating diffusion FD2 while the logic circuit reads the reset voltage, the first pixel voltage, and the second pixel voltage from the pixel. FIG. 10 may be a diagram illustrating states of the photodiode PD, the first floating diffusion FD1, and the second floating diffusion FD2 immediately after the reset operation, and as illustrated in FIG. 10, in the reset operation, the entirety of electric charges of the photodiode PD, the first floating diffusion FD1 and the second floating diffusion FD2 may be removed. In FIGS. 11-13, electric charges may be represented by the darkened areas.

Thereafter, referring to FIG. 11, electric charges may be generated by the photodiode PD during the exposure time after the reset operation. When strong light which may cause the photodiode PD to be saturated enters during the exposure time, electric charges generated after the photodiode PD is saturated may move to the second floating diffusion FD2 through the second transfer transistor TX2. As illustrated in FIG. 11, the second transfer transistor TX2 may maintain a turn-off state more weakly than the first transfer transistor TX1 during the exposure time such that electric charges may move to the second floating diffusion FD2.

When the exposure time elapses, the first transfer transistor TX1 may be turned on as illustrated in FIG. 12. Accordingly, electric charges of the photodiode may move to the first floating diffusion FD1 through the first transfer transistor TX1. Thereafter, the logic circuit may obtain the output voltage of the driving transistor SF obtained by amplifying the voltage of the first floating diffusion FD1 as the first pixel voltage.

Thereafter, as illustrated in FIG. 13, electric charges accumulated in the second floating diffusion FD2 may move to the first floating diffusion EDI. As described above, as the first reset transistor RX1 is turned on, the second floating diffusion FD2 and the first floating diffusion FD1 may be connected to each other, such that capacity of the entirety of a capacitor provided by the floating diffusion may increase, and electric charges of the second floating diffusion FD2 may be combined with electric charges of the first floating diffusion FD1.

The logic circuit may obtain the second pixel voltage output by the driving transistor SF after electric charges of the first floating diffusion FD1 and electric charges of the second floating diffusion FD2 are combined. Accordingly, even when a large amount of electric charges are generated during the exposure time such that the photodiode PD is saturated, the logic circuit may read the pixel voltage corresponding to the generated electric charges without loss of electric charge, and the range of brightness which the image may express may increase and the dynamic range of the image sensor may improve.

Figure 14:
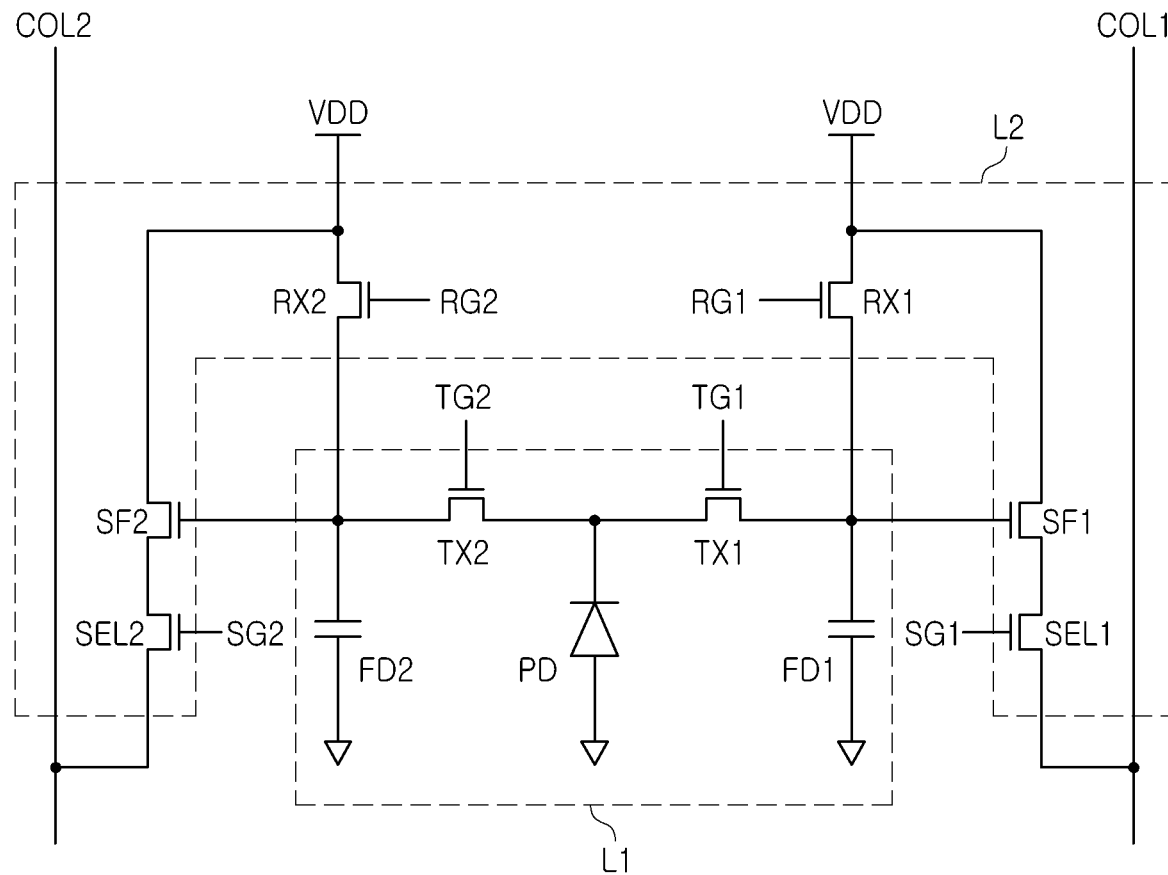
FIG. 14 is a circuit diagram illustrating a pixel included in an image sensor according to an example embodiment of the present disclosure.
Figure 15:
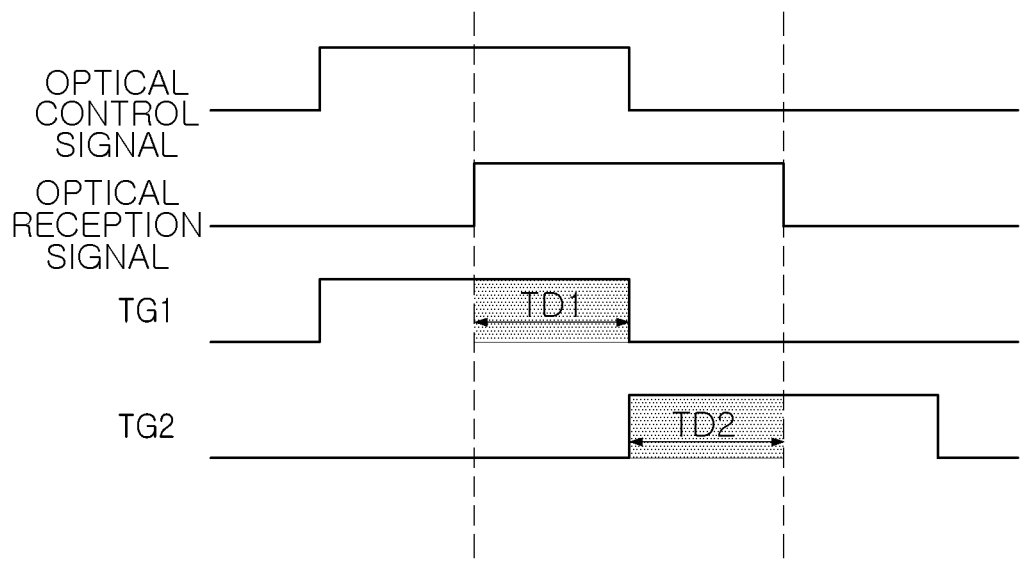
FIG. 15 is a diagram illustrating operations of an image sensor according to an example embodiment of the present disclosure.

FIG. 14 is a circuit diagram illustrating a pixel included in an image sensor according to an example embodiment. FIG. 15 is a diagram illustrating operations of an image sensor according to an example embodiment.

Referring to FIG. 14, pixels of the image sensor in an example embodiment may include a photodiode PD, a first floating diffusion FD1, a second floating diffusion FD2, a first transfer transistor TX1, a second transfer transistor TX2, a first reset transistor RX1, a second reset transistor RX2, a first driving transistor SF1, a second driving transistor SF2, a first select transistor SEL1 and a second select transistor SEL2. The first floating diffusion FD1 the second floating diffusion FD2, the first transfer transistor TX1, and the second transfer transistor TX2 may be formed on the first layer L1 together with the photodiode P1). The first reset transistor RX1, the second reset transistor RX2, the first driving transistor SF1, the second driving transistor SF2, the first select transistor SEL1 and the second select transistor SEL2 may be formed on the second layer L2. The first select transistor SEL1 may be connected to a first column line COL1, and the second select transistor SEL2 may be connected to a second column line COL2.

An image sensor having pixels having the structure as illustrated in FIG. 14 may operate as a ToF sensor for generating a depth map or measuring a distance to a subject. For example, the logic circuit may generate a first transfer control signal TG1 and a second transfer control signal TG2 to have opposite phases. In addition, the image sensor may operate in conjunction with a light source for irradiating light to a subject. For example, the light source may operate by an optical control signal which is a pulse width modulation (PWM) signal having a predetermined frequency and duty ratio, the first transfer control signal TG1 may be the same signal as the optical control signal, and the second transfer control signal TG2 may have a phase difference of 180 degrees from the optical control signal. Hereinafter, the operation of the pixel will be described with reference to FIG. 15.

Referring to FIG. 15, a light control signal (also referred to as an optical control signal) may be input to a light source interlocked with the image sensor and the light source may operate. Light output by the light source may be reflected from a subject and may be incident to the image sensor as a light reception signal (also referred to as an optical reception signal). The optical reception signal may have a predetermined phase difference from the optical control signal.

The logic circuit of the image sensor may reset the first floating diffusion FD1 and the second floating diffusion FD2 by turning on the first reset transistor RX1 and the second reset transistor RX2 using the first reset control signal RG1 and the second reset control signal RG2. Thereafter, as illustrated in FIG. 15, the first transfer control signal TG1 and the second transfer control signal TG2 having opposite phases may be input to the first transfer transistor TX1 and the second transfer transistor TX2, respectively.

The time in which the first transfer transistor TX1 is turned on by receiving the turn-on voltage may be the same as the time in which the second transfer transistor TX2 is turned on by receiving the turn-on voltage. While the first transfer transistor TX1 receives the turn-on voltage, the second transfer transistor TX2 may receive the turn-off voltage, and while the second transfer transistor TX2 receives the turn-on voltage, the first transfer transistor TX1 may receive a turn-on voltage.

Since the first transfer control signal TG1 and the second transfer control signal TG2 have opposite phases, the amount of electric charges accumulated in the first floating diffusion FD1 and the second floating diffusion FD2 may vary depending on the phase of the received signal. For example, in the first floating diffusion FD1, electric charges generated by the photodiode PD during a first time period TD1 in which the turn-on time of the first transfer transistor TX1 overlaps the reception time of the light reception signal may be accumulated. In the second floating diffusion FD2, electric charges generated by the photodiode PD during the second time period TD2 in which the turn-on time of the second transfer transistor TX2 overlaps the reception time of the light reception signal may be accumulated.

The logic circuit may receive a voltage signal output by each of the first driving transistor SF1 and the second driving transistor SF2 through the first column line COLT and the second column line COL2. The logic circuit may generate a depth map or may determine a distance to a subject using the first voltage signal received through the first column line COL1 and the voltage signal received through the second column line COL2.

FIGS. 16 to 20 are diagrams illustrating a method of manufacturing an image sensor according to an example embodiment.

Figure 16:
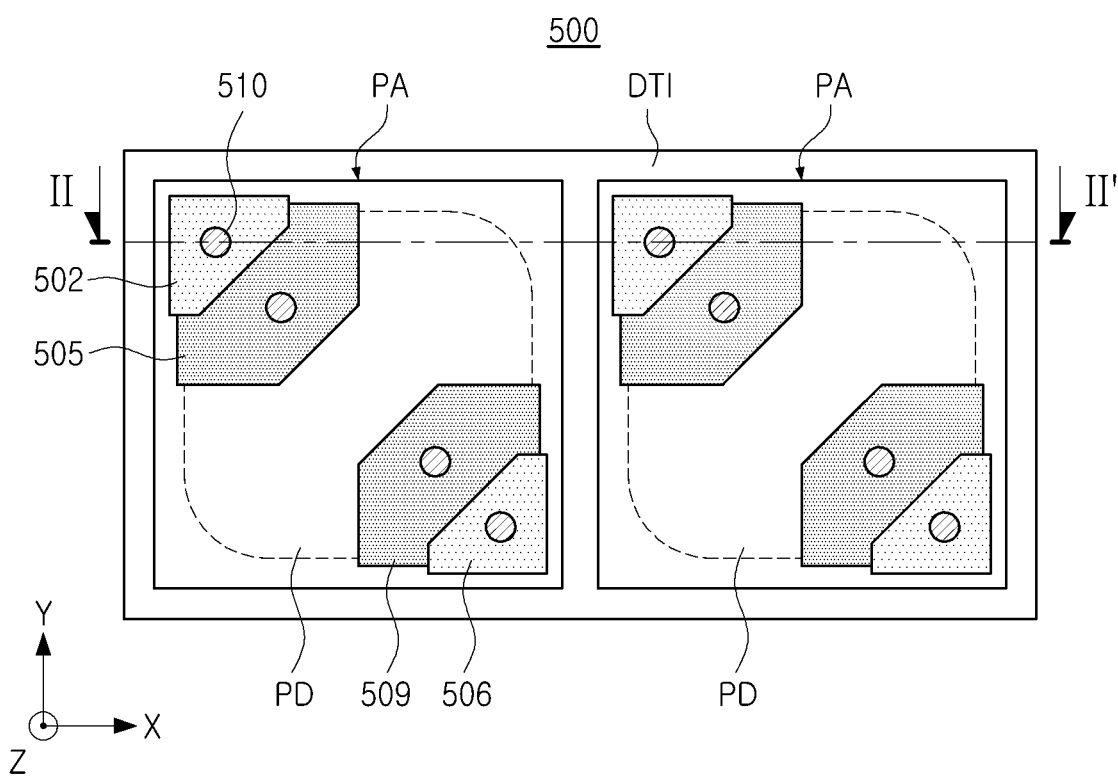
FIGS. 16, 17, 18, 19 and 20 are diagrams illustrating a method of manufacturing an image sensor according to an example embodiment of the present disclosure.
Figure 17:
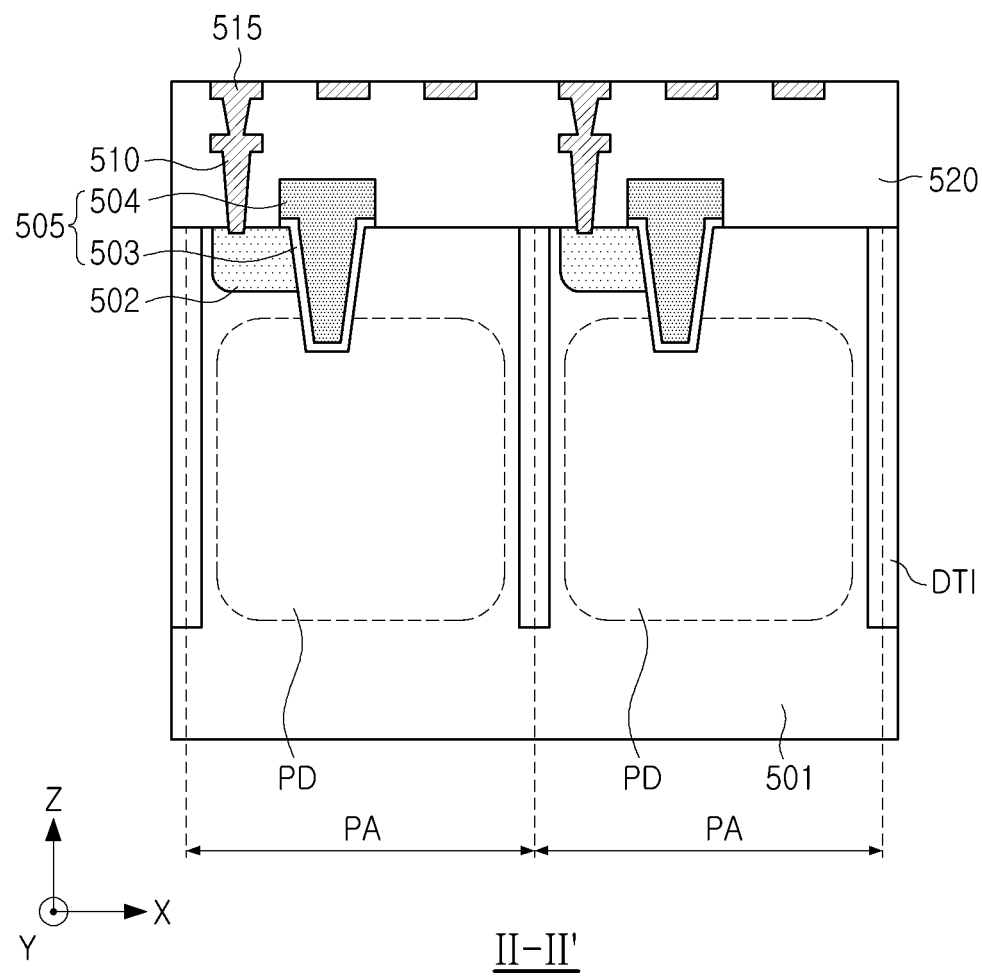

Referring to FIGS. 16 and 17, a plurality of pixel regions PA may be defined by forming a pixel isolation layer DTI on a first substrate 501, and a plurality of photodiodes may be formed in the first substrate 501. In the example embodiment described with reference to FIGS. 16 to 20, it may be assumed that a single photodiode PD is formed in a single pixel region PA, but alternatively, two or more photodiodes PD may be formed in a single pixel region PA.

In addition, impurity regions 502 and 506 providing floating diffusions, and transfer gates 505 and 509 providing transfer transistors may be formed in each of the plurality of pixel regions PA. The first impurity region 502 may provide a first floating diffusion, and the second impurity region 506 may provide a second floating diffusion. The first transfer gate 505 may provide a first transfer transistor together with the photodiode PD and the first impurity region 502, and the second transfer gate 509 may provide a second transfer transistor together with the photodiode PD and the second impurity region 506. Accordingly, a first floating diffusion, a second floating diffusion, a first transfer transistor, and a second transfer transistor may be formed in each of the plurality of pixel regions PA. FIG. 17 further shows a first wiring pattern 510 and a first gate electrode layer 504 and a first gate insulating layer 503 of the first transfer gate 505, for example.

Figure 18:
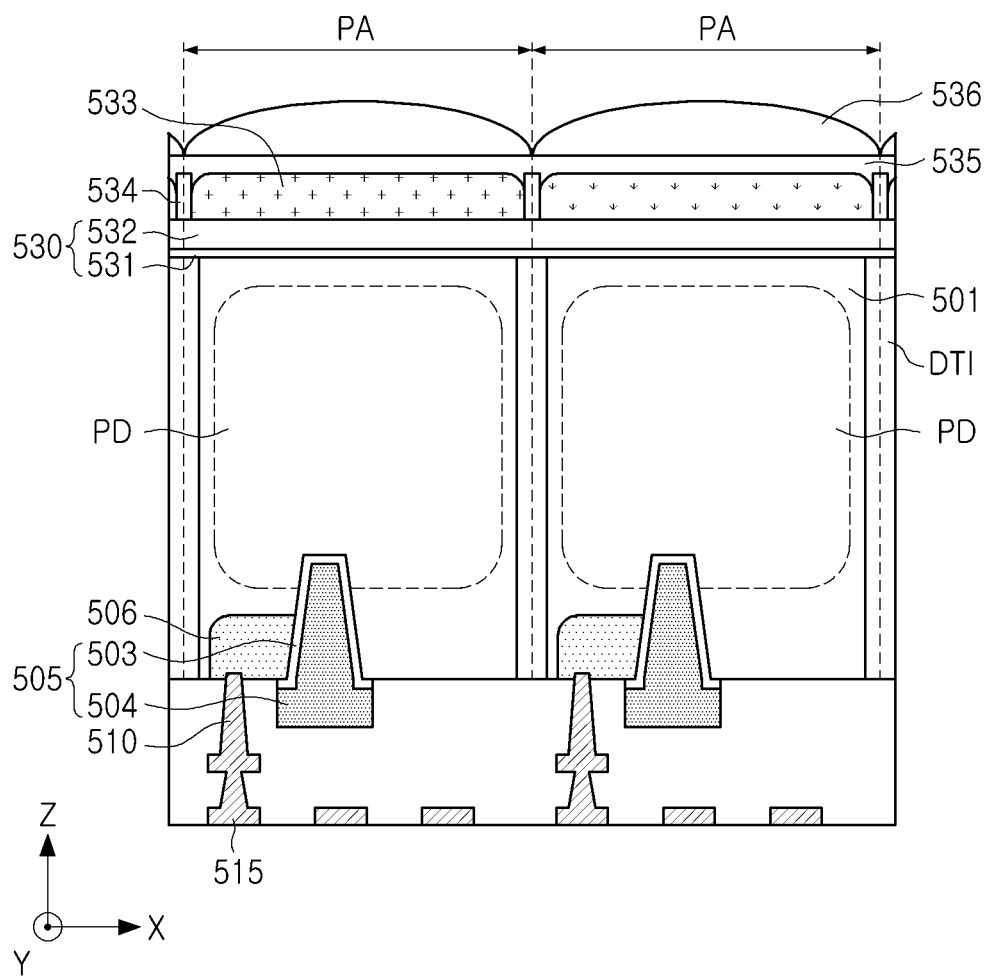

Thereafter, with reference to FIG. 18, at least a portion of the first substrate 501 may be removed by applying a chemical mechanical polishing (CMP) process to the exposed region of the first substrate 501, and an optical region may be formed on one surface of the first substrate SOL As described above, the optical region may include a horizontal insulating layer 530, color filters 533, a filter isolation layer 534, a planarization layer 535, and microlenses 536. The horizontal insulating layer 530 may include a first horizontal insulating layer 531 and a second horizontal insulating layer 532, and the first horizontal insulating layer 531 may be formed of a material having a dielectric constant higher than that of silicon oxide. Defects generated by the first substrate 501 in the CMP process may be cured by the first horizontal insulating layer 531. By forming an optical region on one surface of the first substrate 501, the first layer L1 may be manufactured.

Figure 19:
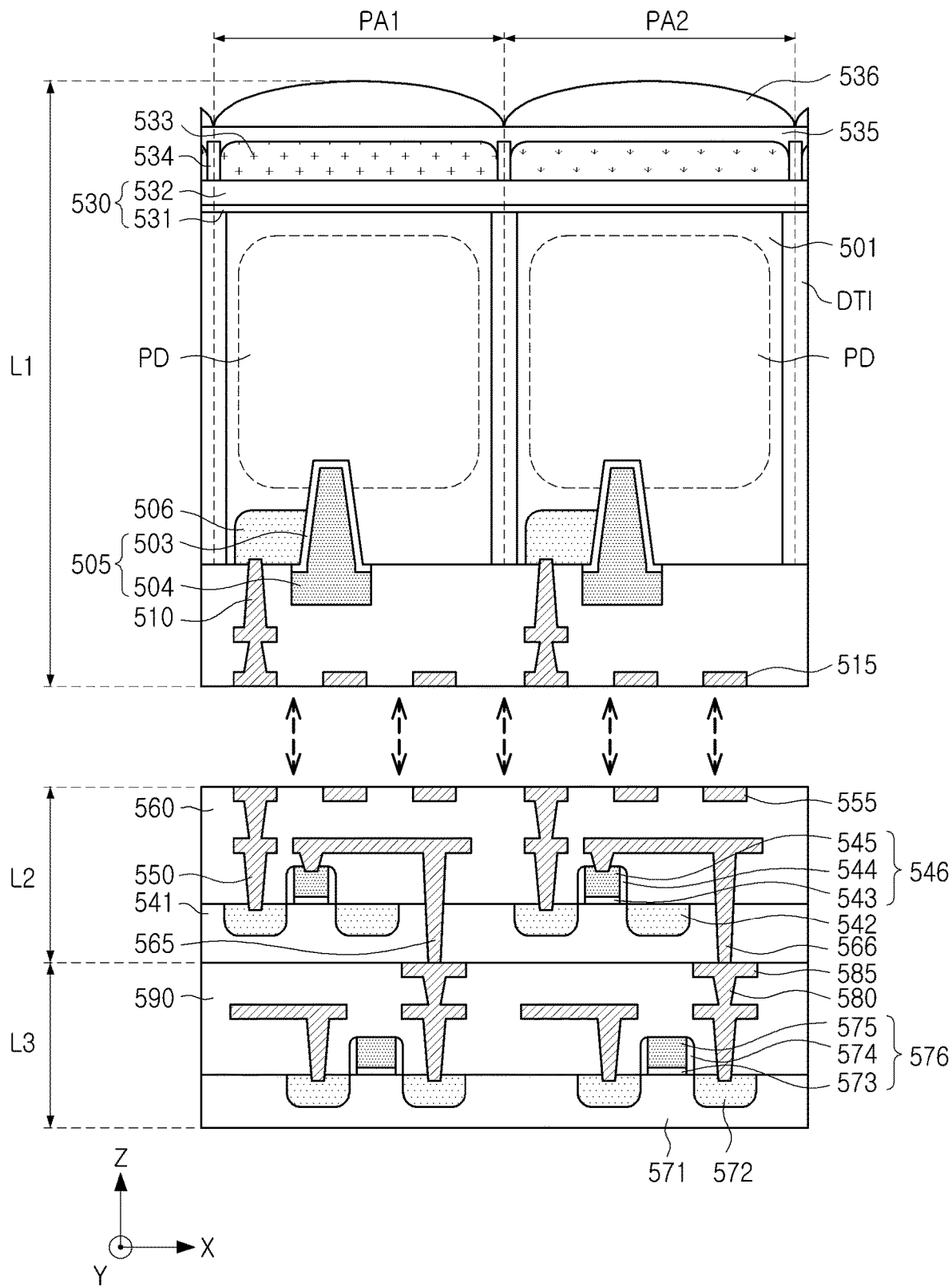
Figure 20:
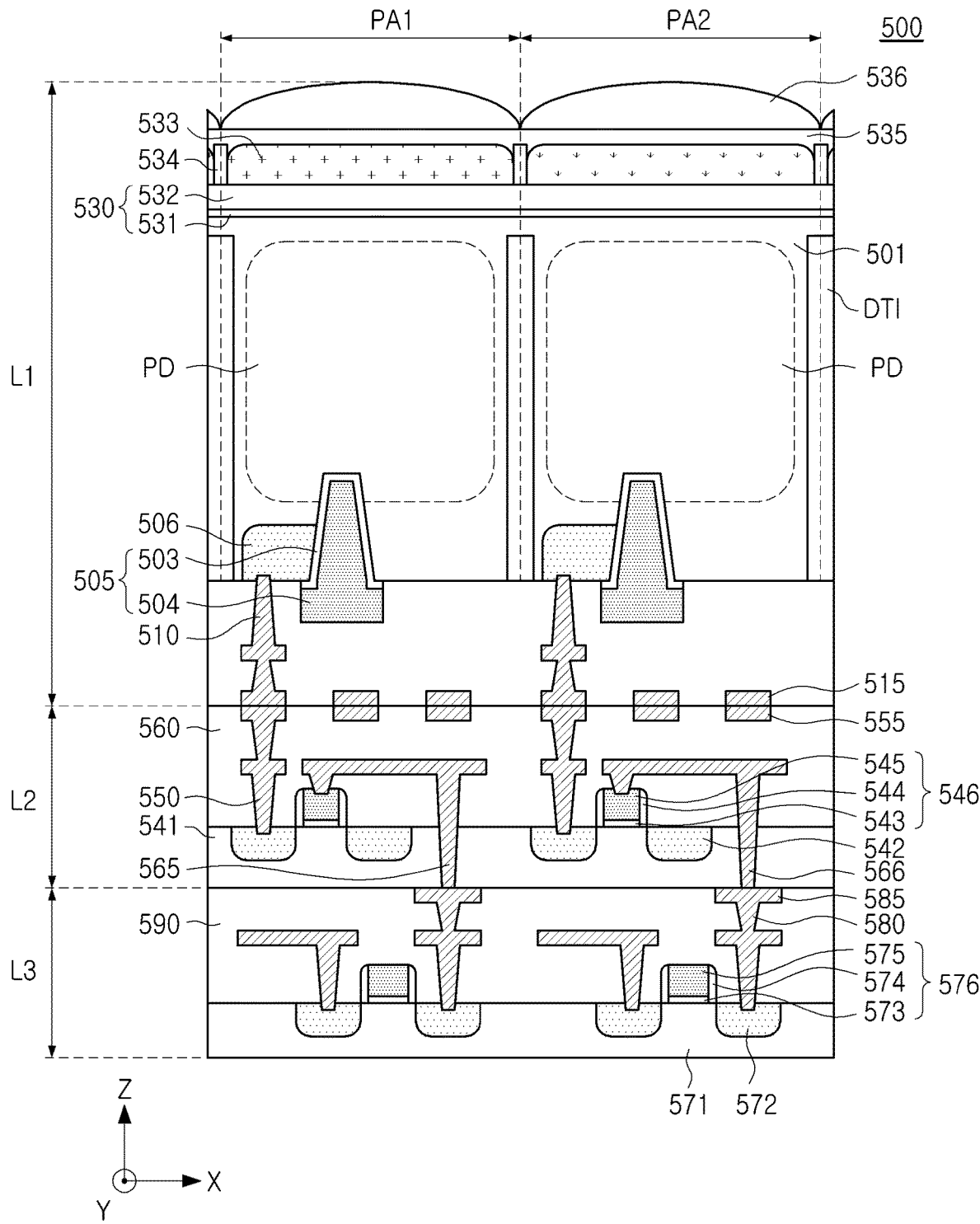

Thereafter, referring to FIGS. 19 and 20, the second layer L2 and the third layer L3 may be attached to the first layer L1. In the example embodiment illustrated in FIGS. 19 and 20, the second layer L2 and the third layer L3 may be attached, and thereafter, the first layer L1 and the second layer L2 may be attached. However, alternatively, after attaching the second layer L2 to the first layer L1, the third layer L3 may be attached to the second layer L2.

Referring to FIGS. 19 and 20, the first layer L1 and the second layer may be attached to each other by a Cu—Cu bonding method. For example, a first pad 515 exposed externally of a first interlayer insulating layer 520 in the first layer L1 may be connected to a second pad 555 exposed externally of a second interlayer insulating layer 560 of the second layer L2 by Cu—Cu bonding. Accordingly, as illustrated in FIG. 20, the first impurity region 502 of the first layer L1 may be connected to the elements of the second layer L2. An element connected to the first impurity region 502 of the first layer L1 may be the aforementioned first reset transistor.

The second layer L2 and the third layer L3 may be connected to each other by via structures 565 and 566. For example, the first reset transistor of the second layer L2 may be connected to the logic circuit of the third layer L3 by the first via structure 565, and the second reset transistor of the second layer L2 may be connected to the logic circuit of the third layer L3 by the second via structure 566.

FIG. 19 further shows contacts 550 and 580, a second substrate 541, a third interlayer insulating layer 590, impurity regions 542 and 572, a third substrate 571, and a third pad 585. FIG. 19 also shows gate structures 546 and 576 which have elements the same as the gate structures 346 and 276 shown in FIG. 6 except that they are denoted with reference numerals starting with '5'.

According to the aforementioned example embodiments, by implementing pixel circuits that are made by forming the elements of the pixel circuits in different layers in a dispersed manner and stacking the layers, a dynamic range of the image sensor can improve, and a ToF function for measuring the distance to a subject can be implemented in the image sensor.

While the example embodiments have been illustrated and described above, it will be apparent to those skilled in the art that modifications and variations could be made thereto without departing from the scope of the present disclosure as set forth by the appended claims.

What is claimed is:

1. An image sensor, comprising:
a first layer including a plurality of photodiodes arranged in a plurality of pixel regions in a first substrate, an optical region disposed on an upper surface of the first substrate, and an element region,
wherein, in at least one of the plurality of pixel regions, the element region includes a first impurity region, a first transfer gate disposed between the first impurity region and the photodiode, a second impurity region isolated from the first impurity region, and a second transfer gate disposed between the second impurity region and the photodiode; and
a second layer including a second substrate stacked with the first layer,
wherein the second layer includes a first transistor connected to the first impurity region by a first contact, and a second transistor connected to the second impurity region by a second contact,
wherein the plurality of pixel regions are arranged in first and second directions parallel to an upper surface of the first substrate, and the first direction and the second direction are perpendicular to each other, and
wherein, in the at least one of the plurality of pixel regions, the first impurity region and the second impurity region are isolated from each other in a diagonal direction intersecting the first direction and the second direction.

2. The image sensor of claim 1, wherein at least one of the first transistor and the second transistor is directly connected to a, first power node configured to supply a first power voltage.

3. The image sensor of claim 2, wherein the first transistor is connected between the first impurity region and the second impurity region, and the second transistor is connected between the second impurity region and the first power node.

4. The image sensor of claim 2, wherein the first transistor is connected between the first impurity region and the first power node, and the second transistor is connected between the second impurity region and the first power node.

5. The image sensor of claim 1, wherein the at least one of the plurality of regions further includes a third transistor having a gate connected to the first impurity region, and a fourth transistor connected to the third transistor in series.

6. The image sensor of claim 1, wherein the first transfer gate and the second transfer gate are isolated from each other in the diagonal direction and are disposed between the first impurity region and the second impurity region in the diagonal direction.

7. The image sensor of claim 1, further comprising:
a third layer including a row decoder configured to output control voltages that are input to the first transfer gate, the second transfer gate, the first transistor, and the second transistor, and an analog-to-digital converter (ADC) circuit configured to read a pixel voltage corresponding to electric charges generated by the plurality of photodiodes and accumulated in at least one of the first impurity region and the second impurity region, and stacked with the second layer in a vertical direction.

8. The image sensor of claim 7, wherein the second layer is disposed between the first layer and the third layer in the vertical direction.

9. The image sensor of claim 1, wherein the first transistor is connected to the first impurity region by a first via structure extending in a vertical direction and penetrating the second substrate, and the second transistor is connected to the second impurity region by a second via structure isolated from the first via structure and penetrating the second substrate.

10. The image sensor of claim 1, wherein the first layer includes first wiring patterns connected to the first impurity region, the first transfer gate, the second impurity region, and the second transfer gate in the element region;
wherein the second layer includes second wiring patterns connected to the first transistor and the second transistor, and
wherein the first wiring patterns and the second wiring patterns are disposed between the first substrate and the second substrate in a vertical direction.

11. The image sensor of claim 10, wherein the second layer further includes a plurality of via structures connected to at least a portion of the second wiring patterns, extending in a first direction, and penetrating the second substrate.

12. The image sensor of claim 1, wherein the first impurity region and the second impurity region are doped with impurities of the same conductivity type.

13. An image sensor, comprising:
a plurality of pixels each having a photodiode and a plurality of elements connected to the photodiode; and
a logic circuit configured to obtain a pixel voltage from the plurality of pixels,
wherein at least one of the plurality of pixels includes a first transfer transistor and a second transfer transistor connected to the photodiode and isolated from each other, a first floating diffusion in which electric charges moving through the first transfer transistor are accumulated, a second floating diffusion in which electric charges moving through the second transfer transistor are accumulated, a first reset transistor connected to the first floating diffusion, a second reset transistor connected to the second floating diffusion, a first amplifier transistor connected to the first floating diffusion, and a first select transistor connected to the first amplifier transistor, wherein, in the at least one of the plurality of pixels, the first transfer transistor, the second transfer transistor, the first floating diffusion, and the second floating diffusion are disposed on a first substrate, and the first reset transistor, the second reset transistor, the first amplifier transistor, and the first select transistor are disposed on a second substrate stacked with the first substrate, wherein the plurality of pixels are arranged in first and second directions parallel to an upper surface of the first substrate, and the first direction and the second direction are perpendicular to each other, and wherein, in the at least one of the plurality of pixels, the first floating diffusion and the second floating diffusion are isolated from each other in a diagonal direction intersecting the first direction and the second direction.

14. The image sensor of claim 13, wherein the logic circuit is disposed on a third substrate stacked with the first substrate and the second substrate.

15. The image sensor of claim 13, wherein the logic circuit resets the first floating diffusion and the second floating diffusion by turning on the first transfer transistor, the second transfer transistor, the first reset transistor, and the second reset transistor during a first time period, wherein the logic circuit turns off the first transfer transistor and the second transfer transistor during a second time period after the first time period, and wherein the logic circuit turns on only the first transfer transistor during a third time period after the second time period, and turns on only the first reset transistor during a fourth time period after the third time period.

16. The image sensor of claim 15, wherein the logic circuit inputs a first turn-off voltage to the first transfer transistor and inputs a second turn-off voltage to the second transfer transistor during the second time period, and wherein a level of the first turn-off voltage is lower than a level of the second turn-off voltage.

17. The image sensor of claim 16, wherein the first turn-off voltage is a negative voltage, and the second turn-off voltage is a ground voltage.

18. The image sensor of claim 13, wherein the at least one of the plurality of pixels further includes a second amplifier transistor connected to the second floating diffusion region, and a second select transistor connected to the second amplifier transistor, and the second amplifier transistor and the second select transistor are disposed on the second substrate, and wherein the logic circuit inputs a first transfer control signal to a gate of the first transfer transistor and inputs a second transfer control signal having a phase opposite to a phase of the first transfer control signal to a gate of the second transfer transistor.

19. An image sensor, comprising:

a first layer including a first substrate and a plurality of pixel regions on the first substrate, wherein a photodiode, a first impurity region and a second impurity region for receiving electric charges generated by the photodiode, a first transfer gate adjacent to the first impurity region and a second transfer gate adjacent to the second impurity region are disposed in at least one of the plurality of pixel regions;

a second layer including a second substrate different from the first substrate, and a plurality of transistors formed on the second substrate and forming a pixel together with the at least one of the plurality of pixel regions; and a third layer in which a logic circuit configured to control the first transfer gate, the second transfer gate, and the plurality of transistors is disposed, wherein the logic circuit controls the first transfer gate and the second transfer gate such that the first impurity region and the second impurity region receive the electric charges generated by the photodiode at different time points, wherein the plurality of pixel regions are arranged in first and second directions parallel to an upper surface of the first substrate, and the first direction and the second direction are perpendicular to each other, and wherein, in the at least one of the plurality of pixel regions, the first impurity region and the second impurity region are isolated from each other in a diagonal direction intersecting the first direction and the second direction.

\* \* \* \* \*